United States Patent
Shotan et al.

(10) Patent No.: US 11,035,957 B2
(45) Date of Patent: Jun. 15, 2021

(54) LIDAR OPTICS ALIGNMENT SYSTEM

(71) Applicant: Waymo LLC, Mountain View, CA (US)

(72) Inventors: Gil Shotan, San Francisco, CA (US); Joshua Wang, Mountain View, CA (US); Luke Wachter, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 490 days.

(21) Appl. No.: 15/991,397

(22) Filed: May 29, 2018

(65) Prior Publication Data

US 2019/0369256 A1 Dec. 5, 2019

(51) Int. Cl.
| | |
|---|---|
| *G01C 3/08* | (2006.01) |
| *G01S 17/89* | (2020.01) |
| *G01S 7/481* | (2006.01) |
| *H04N 5/357* | (2011.01) |
| *H04N 5/225* | (2006.01) |
| *G01S 17/08* | (2006.01) |

(52) U.S. Cl.
CPC ............. *G01S 17/89* (2013.01); *G01S 7/4811* (2013.01); *G01S 17/08* (2013.01); *H04N 5/2254* (2013.01); *H04N 5/357* (2013.01)

(58) Field of Classification Search
CPC ...... G01S 7/4972; G01S 7/4811; G01S 17/89; G01S 17/08; G01S 17/86; H04N 5/2254; H04N 5/357

USPC .......................................................... 356/5.01
See application file for complete search history.

(56) References Cited

U.S. PATENT DOCUMENTS

| | | | |
|---|---|---|---|
| 6,608,677 B1 | 8/2003 | Ray et al. | |
| 6,788,855 B2 | 9/2004 | Massey et al. | |
| 7,064,817 B1 | 6/2006 | Schmitt et al. | |
| 9,910,139 B2 | 3/2018 | Pennecot et al. | |
| 10,663,567 B2 * | 5/2020 | Fenton | G01S 7/4972 |
| 2012/0038903 A1 | 2/2012 | Weimer et al. | |
| 2016/0282453 A1 * | 9/2016 | Pennecot | G01S 7/4972 |
| 2016/0327785 A1 | 11/2016 | Truscott et al. | |
| 2019/0253701 A1 * | 8/2019 | Himel | G01S 7/497 |
| 2020/0348403 A1 * | 11/2020 | Valois | G01S 17/931 |

\* cited by examiner

*Primary Examiner* — Mark Hellner
(74) *Attorney, Agent, or Firm* — McDonnell Boehnen Hulbert & Berghoff LLP

(57) ABSTRACT

One example method involves obtaining a plurality of images using a camera located at a given position relative to a light detection and ranging device (LIDAR). A first image of the plurality may be indicative of a view, via one or more optical elements of the LIDAR, of a receiver of the LIDAR. The method also involves determining simulated detector positions for intercepting reflections of simulated light beams associated with a plurality of light sources in a transmitter of the LIDAR. The method also involves determining one or more alignment offsets between the transmitter and the receiver based on at least the simulated detector positions and the plurality of images.

18 Claims, 14 Drawing Sheets

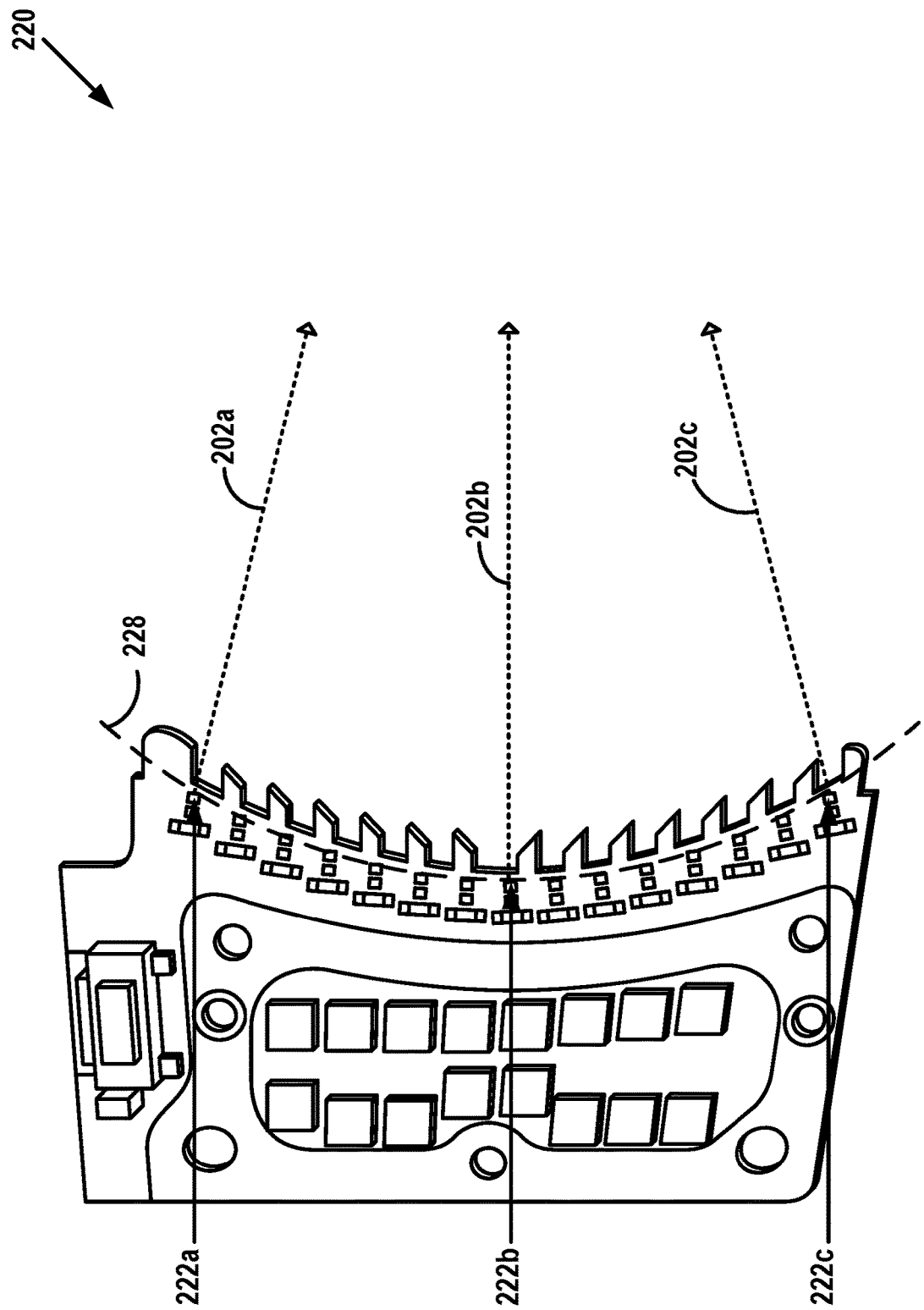

LIDAR OPTICS ALIGNMENT SYSTEM

BACKGROUND

Unless otherwise indicated herein, the materials described in this section are not prior art to the claims in this application and are not admitted to be prior art by inclusion in this section.

A LIDAR can estimate distances to environmental features while scanning through a scene to assemble a "point cloud" indicative of reflective surfaces in the environment. Individual points in the point cloud can be determined by transmitting a laser pulse and detecting a returning pulse, if any, reflected from an object in the environment, and determining the distance to the object according to the time delay between the transmission of the transmitted pulse and the reception of the reflected pulse. A laser, or set of lasers, can be rapidly and repeatedly scanned across a scene to provide continuous real-time information on distances to objects in the scene. Combining the measured distances and the orientation of the laser(s) while measuring each distance allows for associating a three-dimensional position with each returning pulse. In this way, a three-dimensional map of points indicative of locations of reflective features in the environment can be generated for a scanning zone.

SUMMARY

In one example, a method involves obtaining a plurality of images using a camera at a given position relative to a light detection and ranging device (LIDAR). The LIDAR includes a transmitter comprising a plurality of light sources, a receiver comprising a plurality of light detectors, and one or more optical elements. Obtaining the plurality of images comprises capturing a first image indicative of a view, via the one or more optical elements, of the receiver. The method also involves determining simulated detector positions for intercepting reflections of simulated light beams associated with the plurality of light sources. The method also involves determining one or more alignment offsets between the transmitter and the receiver based on at least the simulated detector positions and the plurality of images.

In another example, a system includes a platform that supports a light detection and ranging device (LIDAR). The LIDAR includes a transmitter comprising a plurality of light sources, a receiver comprising a plurality of light detectors, and one or more optical elements. The system also includes a camera located at a given position relative to the LIDAR. The system also includes a controller that causes the camera to obtain a plurality of images including a first image indicative of a view, via the one or more optical elements, of the transmitter or the receiver. The controller also determines simulated detector positions for intercepting reflections of simulated light beams associated with the plurality of light sources. The controller also determines one or more alignment offsets between the transmitter and the receiver based on at least the simulated detector positions and the plurality of images.

In yet another example, a non-transitory computer readable medium stores instructions that, when executed by one or more processors of a computing device, cause the computing device to perform operations. The operations comprise capturing a plurality of images using a camera at a given position relative to a light detection and ranging device (LIDAR). The LIDAR includes a transmitter comprising a plurality of light sources, a receiver comprising a plurality of light detectors, and one or more optical elements. The plurality of images includes a first image indicative of a view, via the one or more optical elements, of the receiver. The operations also comprise determining simulated detector positions for intercepting reflections of simulated light beams associated with the plurality of light sources. The operations also comprise determining one or more alignment offsets between the transmitter and the receiver.

In still another example, a system includes a means for obtaining a plurality of images using a camera at a given position relative to a light detection and ranging device (LIDAR). The LIDAR includes a transmitter comprising a plurality of light sources, a receiver comprising a plurality of light detectors, and one or more optical elements. Obtaining the plurality of images comprises capturing a first image indicative of a view, via the one or more optical elements, of the receiver. The system also includes a means for determining simulated detector positions for intercepting reflections of simulated light beams associated with the plurality of light sources. The system also includes a means for determining one or more alignment offsets between the transmitter and the receiver based on at least the simulated detector positions and the plurality of images.

In still another example, a system includes a means for capturing a plurality of images using a camera at a given position relative to a light detection and ranging device (LIDAR). The LIDAR includes a transmitter comprising a plurality of light sources, a receiver comprising a plurality of light detectors, and one or more optical elements. The plurality of images includes a first image indicative of a view, via the one or more optical elements, of the receiver. The operations also comprise determining simulated detector positions for intercepting reflections of simulated light beams associated with the plurality of light sources. The operations also comprise determining one or more alignment offsets between the transmitter and the receiver.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 2 illustrates a LIDAR transmitter, according to an example embodiment.

DETAILED DESCRIPTION

The following detailed description describes various features and functions of the disclosed systems, devices and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations.

Within examples, a LIDAR may include a transmitter and a receiver. The transmitter may include one or more light sources that transmit light toward an environment. The receiver may include one or more light detectors that detect reflections of the transmitted light. For example, a light beam emitted by a given light source and reflected back toward the LIDAR may be received by a corresponding light detector. To facilitate operation of the LIDAR, some example systems and methods herein may relate to alignment of the light source(s) in the transmitter with corresponding light detector(s) in the receiver.

I. Example Lidar Devices

Example LIDAR devices will now be described in greater detail. It is noted that the various LIDAR Optics Alignment systems, devices, and methods of the present disclosure can be employed with various types of LIDAR devices having various numbers of light sources and detectors, and/or implemented using various geometries among other possibilities. Thus, the example LIDAR implementations illustrated herein are only for the sake of example. Other LIDAR structures, arrangements, and configurations are possible as well.

Figure 1A:
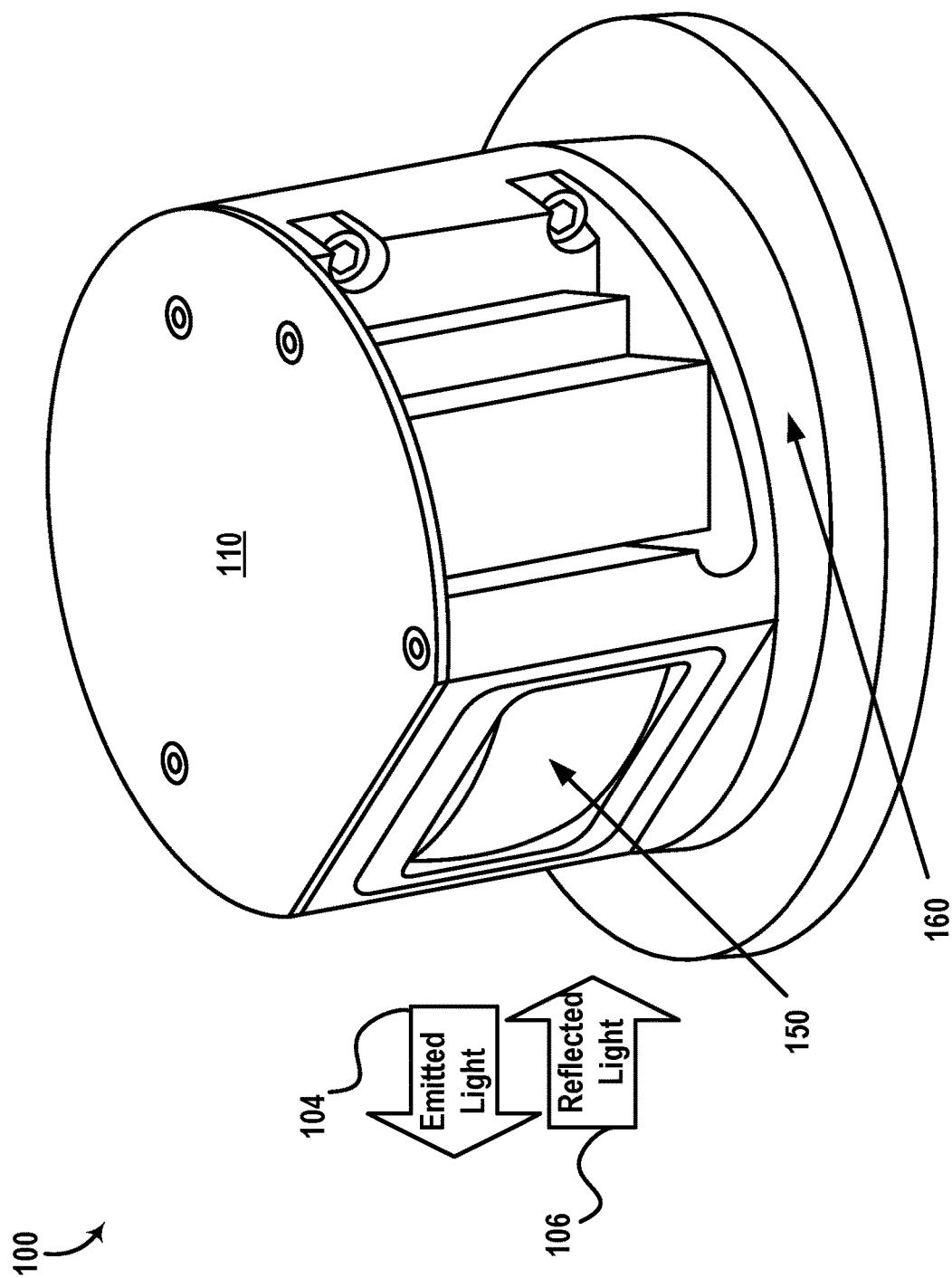
FIG. 1A illustrates a LIDAR, according to an example embodiment.

FIG. 1A illustrates a LIDAR device 100, according to an example embodiment. As shown, the LIDAR 100 includes a housing 110, a lens 150, and a mounting structure 160. Additionally, light beams 104 emitted by the LIDAR 100 propagate from the lens 150 along a viewing direction of the first LIDAR 100 toward an environment of the LIDAR 100, and reflect off one or more objects in the environment as reflected light 106.

The housing 110 can provide a platform for mounting the various components included in the LIDAR 100. The housing 110 can be formed from any material capable of supporting the various components of the LIDAR 100 included in an interior space of the housing 110. For example, the housing 110 may be formed from a solid material such as plastic or metal among other possibilities.

In some examples, the housing 110 can be configured to have a substantially cylindrical shape and to rotate about an axis of the LIDAR 100. For example, the housing 110 can have the substantially cylindrical shape with a diameter of approximately 10 centimeters. In some examples, the axis of the LIDAR 100 is substantially vertical. By rotating the housing 110 that includes the various components, in some examples, a three-dimensional map of a 360-degree view of the environment of the LIDAR 100 can be determined. Additionally or alternatively, in some examples, the LIDAR 100 can be tilted, e.g., such that the axis of rotation of the housing 110 provides a particular field of view for the LIDAR 100.

The lens 150 mounted to the housing 110 can have an optical power to both collimate the emitted light beams 104, and focus the reflected light 106 from one or more objects in the environment of the LIDAR 100 onto detectors in the LIDAR 100. By using the same lens 150 to perform both of these functions, instead of a transmit lens for collimating and a receive lens for focusing, advantages with respect to size, cost, and/or complexity can be provided.

The mounting structure 160 may rotate about an axis to provide a 360-degree view of the environment surrounding the LIDAR 100. In some examples, the mounting structure 160 may comprise a movable platform that may tilt in one or more directions to change the axis of rotation of the LIDAR 100.

Figure 1B:
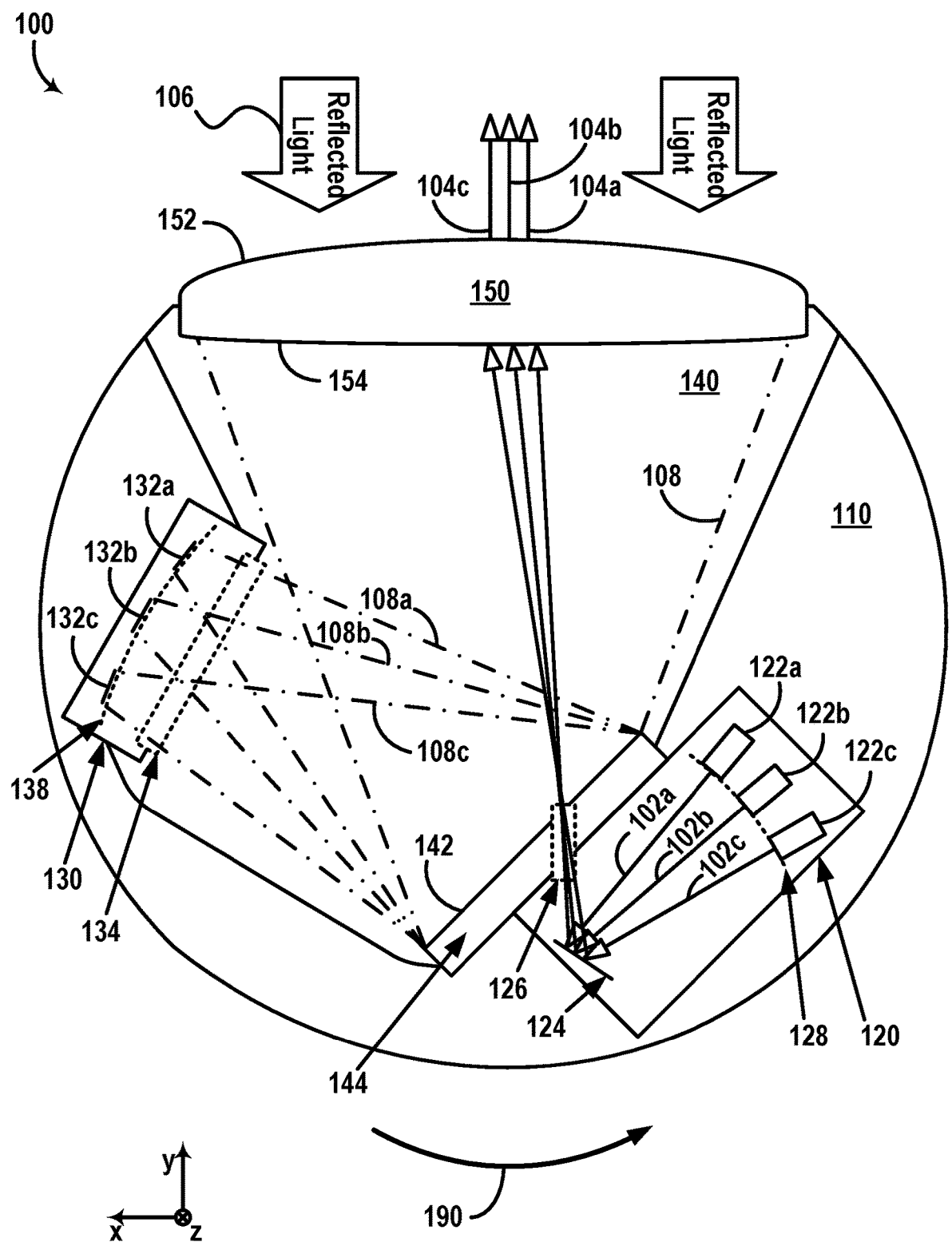
FIG. 1B is a cross-section view of the LIDAR shown in FIG. 1A.

FIG. 1B is a cross-section view of the LIDAR 100. As shown, the housing 110 includes a transmitter 120, a receiver 130, a shared space 140, and the lens 150. For purposes of illustration, FIG. 1B shows an x-y-z axis, in which the z-axis is pointing out of the page.

The transmitter 120 includes a plurality of light sources 122a-c that may be arranged along a curved focal surface 128 defined by the lens 150. The plurality of light sources 122a-c can be configured to emit, respectively, the plurality of light beams 102a-c having wavelengths within a wavelength range. For example, the plurality of light sources 122a-c may comprise laser diodes that emit the plurality of light beams 102a-c having the wavelengths within the wavelength range. The plurality of light beams 102a-c are reflected by mirror 124 through an exit aperture 126 into the shared space 140 and towards the lens 150.

The light sources 122a-c can include laser diodes, light emitting diodes (LED), laser bars (e.g., diode bars), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), or any other device configured to selectively transmit, reflect, and/or emit light to provide the plurality of emitted light beams 102a-c. In some examples, the light sources 122a-c can be configured to emit the emitted light beams 102a-c in a wavelength range that can be detected by detectors 132a-c included in the receiver 130. The wavelength range could, for example, be in the ultraviolet, visible, and/or infrared portions of the electromagnetic spectrum. In some examples, the wavelength range can be a narrow wavelength range, such as provided by lasers. In one embodiment, the wavelength range includes a source wavelength of 905 nm. Additionally, the light sources 122a-c can be configured to emit the emitted light beams 102a-c in the form of pulses. In some examples, the plurality of light sources 122a-c can be disposed on one or more substrates (e.g., printed circuit boards (PCB), flexible PCBs, etc.) and arranged to emit the plurality of light beams 102a-c towards the exit aperture 126.

Although FIG. 1B shows that the curved focal surface 128 is curved in a horizontal plane (e.g., x-y plane), additionally or alternatively, the light sources 122a-c may be arranged along a focal surface that is curved in a vertical plane. For example, the curved focal surface 128 can have a curvature in a vertical plane, and the plurality of light sources 122a-c can include additional light sources arranged vertically along the curved focal surface 128 and configured to emit light beams directed at the mirror 124 and reflected through the exit aperture 126. In this example, the detectors 132a-c may also include additional detectors that correspond to additional light sources of the light sources 122a-c. Further, in some examples, the light sources 122a-c may include additional light sources arranged horizontally along the curved focal surface 128. In one embodiment, the light sources 122a-c may include 64 light sources that emit light having a wavelength of 905 nm. For instance, the 64 light sources may be arranged in four columns, each comprising 16 light sources, along the curved focal surface 128. In this instance, the detectors 132a-c may include 64 detectors that are arranged similarly (e.g., 4 columns comprising 16 detectors each, etc.) along curved focal surface 138. In other embodiments, the light sources 122a-c and the detectors 132a-c may include additional or fewer light sources and/or detectors than those shown in FIG. 1B.

Due to the arrangement of the plurality of light sources 122a-c along the curved focal surface 128, the plurality of light beams 102a-c, in some examples, may converge towards the exit aperture 126. Thus, in these examples, the exit aperture 126 may be minimally sized while being capable of accommodating vertical and horizontal extents of the plurality of light beams 102a-c. Additionally, in some examples, the curved focal surface 128 can be defined by the lens 150. For example, the curved focal surface 128 may correspond to a focal surface of the lens 150 due to shape and composition of the lens 150. In this example, the plurality of light sources 122a-c can be arranged along the focal surface defined by the lens 150 at the transmitter.

The plurality of light beams 102a-c propagate in a transmit path that extends through the transmitter 120, the exit aperture 126, and the shared space 140 towards the lens 150. The lens 150 may collimate the plurality of light beams 102a-c to provide collimated light beams 104a-c into an environment of the LIDAR device 100. The collimated light beams 104a-c may correspond, respectively, to the plurality of light beams 102a-c. In some examples, the collimated light beams 104a-c reflect off one or more objects in the environment of the LIDAR 100 as reflected light 106. The reflected light 106 may be focused by the lens 150 into the shared space 140 as focused light 108 traveling along a receive path that extends through the shared space 140 toward the receiver 130. For example, the focused light 108 may be reflected by the reflective surface 142 as focused light 108a-c propagating toward the receiver 130.

Thus, the lens 150 may be capable of both collimating the plurality of light beams 102a-c and focusing the reflected light 106 based on the shape and composition of the lens 150. For example, the lens 150 can have an aspheric surface 152 facing outside of the housing 110 and a toroidal surface 154 facing the shared space 140. By using the same lens 150 to perform both of these functions, instead of a transmit lens for collimating and a receive lens for focusing, advantages with respect to size, cost, and/or complexity can be provided.

As shown, the exit aperture 126 is included in a wall 144 that separates the transmitter 120 from the shared space 140. In some examples, the wall 144 can be formed from a transparent material (e.g., glass) that is coated with a reflective material 142. In this example, the exit aperture 126 may correspond to the portion of the wall 144 that is not coated by the reflective material 142. Additionally or alternatively, the exit aperture 126 may comprise a hole or cut-away in the wall 144.

The focused light 108 is reflected by the reflective surface 142 and directed toward an entrance aperture 134 of the receiver 130. In some examples, the entrance aperture 134 may comprise a filtering window (e.g., "light filter") configured to transmit wavelengths in the wavelength range of the plurality of light beams 102a-c (e.g., source wavelength) emitted by the plurality of light sources 122a-c and attenuate other wavelengths. In some examples, the entrance aperture 134 may comprise a half-mirror configured to reflect a portion of the focused light 108a-c and allow another portion of the focused light 108a-c to propagate toward the detectors 132a-c. Thus, as shown, at least a portion of the focused light 108a-c propagates toward a plurality of detectors 132a-c.

The plurality of detectors 132a-c can be arranged along a curved focal surface 138 of the receiver 130. Although FIG. 1B shows that the curved focal surface 138 is curved along the x-y plane (horizontal plane), additionally or alternatively, the curved focal surface 138 can be curved in a vertical plane. The curvature of the focal surface 138 may be defined by the lens 150. For example, the curved focal surface 138 may correspond to a focal surface of the light projected by the lens 150 along the receive path at the receiver 130.

The detectors 132a-c may comprise photodiodes, avalanche photodiodes, phototransistors, cameras, active pixel sensors (APS), charge coupled devices (CCD), cryogenic detectors, or any other sensor of light configured to receive focused light 108a-c having wavelengths in the wavelength range of the emitted light beams 102a-c (e.g., the source wavelength).

Each of the focused light 108a-c may correspond, respectively, to reflections of the emitted light beams 102a-c and is directed toward, respectively, the plurality of detectors 132a-c. For example, the detector 132a is configured and arranged to received focused light 108a that corresponds to collimated light beam 104a reflected off the one or more objects in the environment of the LIDAR 100. In this example, the collimated light beam 104a corresponds to the light beam 102a emitted by the light source 122a. Thus, the detector 132a receives light that was emitted by the light source 122a, the detector 132b receives light that was emitted by the light source 122b, and the detector 132c receives light that was emitted by the light source 122c.

By comparing the received light 108a-c with the emitted light beams 102a-c, at least one aspect of the one or more objects in the environment of the LIDAR 100 may be determined. For example, by comparing a time when the plurality of light beams 102a-c were emitted by the plurality of light sources 122a-c and a time when the plurality of detectors 132a-c received the focused light 108a-c, a distance between the LIDAR 100 and the one or more objects in the environment of the LIDAR 100 may be determined. In some examples, other aspects such as shape, color, material, etc. may also be determined.

In some examples, the LIDAR 100 may be rotated about an axis to determine a three-dimensional map of the surroundings of the LIDAR 100. For example, the LIDAR 100 may be rotated about a substantially vertical axis as illustrated by arrow 190. Although illustrated that the LIDAR 100 is rotated counterclockwise about the axis as illustrated by the arrow 190, additionally or alternatively, the LIDAR 100 may be rotated in the clockwise direction. In some examples, the LIDAR 100 may be rotated 360 degrees about the axis. In other examples, the LIDAR 100 may be rotated back and forth along a portion of the 360 degree range about the axis. For example, the LIDAR 100 may be mounted on a platform that pivots back and forth about the axis without making a complete rotation.

Thus, the arrangement of the light sources 122a-c and the detectors 132a-c may allow the LIDAR 100 to have a particular vertical field-of-view. In one implementation, the vertical FOV of the LIDAR 100 is 20°. Additionally, the rotation of the LIDAR 100 may allow the LIDAR 100 to have a 360° horizontal FOV Further, the rate of rotation may allow the device to have a particular refresh rate. In one implementation, the refresh rate is 10 Hz (e.g., 10 360 degree rotations per second. The refresh rate along with the arrangement of the light sources 122a-c and the detectors 132a-c may also allow the LIDAR 100 to have a particular angular resolution. In one example, the angular resolution is 0.2°×0.3°. However, the various parameters described above, such as the refresh rate and the angular resolution may vary according to the configuration of the LIDAR 100.

Figure 1C:
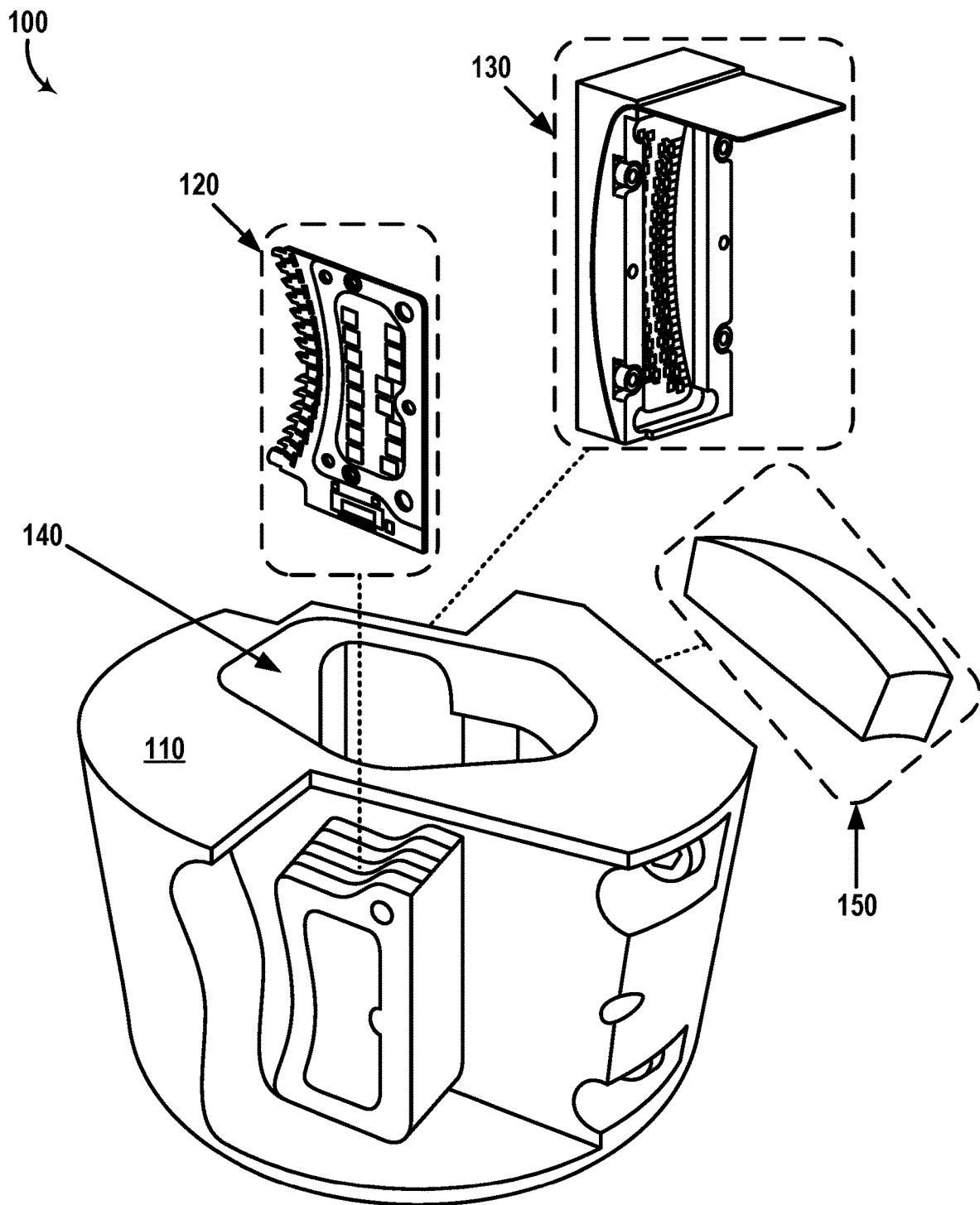
FIG. 1C is a perspective view of the LIDAR shown in FIG. 1A with various components removed to illustrate an interior of the LIDAR.

FIG. 1C is a perspective view of the LIDAR 100 shown in FIG. 1A with various components removed to illustrate an interior of the LIDAR 100. As shown, the various components of the LIDAR 100 can be removably mounted to the housing 110. For example, the transmitter 120 may comprise one or more printed circuit boards (PCBs) that are fitted in the portion of the housing 110 where the transmitter 120 can be mounted. Although FIG. 1C shows the transmitter 120 with one PCB, in some embodiments, the transmitter 120 may include multiple PCBs (not shown) that each include some of the plurality of light sources 132a-c. In one embodiment, each PCB in the transmitter may include 16 light sources, and the transmitter 120 may include four PCBs. Thus, in this embodiment, the LIDAR 100 may include 64 light sources. Other embodiments are possible as well where the transmitter 120 includes a different number of light sources. Additionally, the receiver 130 may comprise a plurality of detectors (e.g., detectors 132a-c, etc.) mounted to a flexible substrate and can be removably mounted to the housing 110 as a block that includes the plurality of detectors. Similarly, the lens 150 can be mounted to another side of the housing 110.

It is noted that LIDAR 100 may include additional, fewer, or different components than those shown in FIGS. 1A-1C. For example, although LIDAR 100 is shown to include a single lens 150 for collimating transmitted light and focusing received light, LIDAR 100 may alternatively be implemented using a transmit lens for collimating the transmitted light and a separate receive lens for focusing the received light. Other examples are possible.

FIG. 2 illustrates a LIDAR transmitter 220, according to an example embodiment. Transmitter 220 may be similar to the transmitter 120 of LIDAR 100. For example, the transmitter 220 includes a plurality of light sources 222a-c, which may include any type of light source (e.g., LED, etc.) similarly to the plurality of light sources 122a-c of the transmitter 120. As shown, the light sources 222a-c are arranged along a focal surface 228, which is curved in a vertical plane. Further, as shown, the light sources 222a-c are configured to emit a plurality of light beams 202a-c. It is noted that the directions of the light beams 202a-c are illustrated as shown only for convenience in description. Thus, in some implementations, the directions of the light beams 202a-c relative to the focal surface 228 may differ from the directions shown.

Although the plurality of light sources 222a-c can be arranged along a focal surface 228 that is curved in a vertical plane, additionally or alternatively, the plurality of light sources 222a-c can be arranged along a focal surface that is curved in a horizontal plane or a focal surface that is curved both vertically and horizontally. For example, the plurality of light sources 222a-c can be arranged in a curved three dimensional grid pattern. For instance, the transmitter 220 may comprise a plurality of printed circuit boards (PCBs) vertically mounted such that a column of light sources (e.g., similar to light sources 222a-c) are along the vertical axis of each PCB and each of the plurality of PCBs can be arranged adjacent to other vertically mounted PCBs along a horizontally curved plane to provide the three dimensional grid pattern. Alternatively, in some examples, the light sources 222a-c may be arranged along any other surface such as a linear or flat surface. Further, although the transmitter 220 is shown to include multiple light sources 222a-c, in some examples, the transmitter 220 may include only one light source or a different number of light sources than those shown in FIG. 2.

Further, it is noted that the arrangement of the light sources in the transmitter 220 is illustrated as shown only for convenience in description. Thus, in some implementations, the arrangement of the light sources may be different than the arrangement shown (e.g., different light source positions, different or non-uniform spacing between one or more pairs of adjacent light sources, etc.).

Figure 3A:
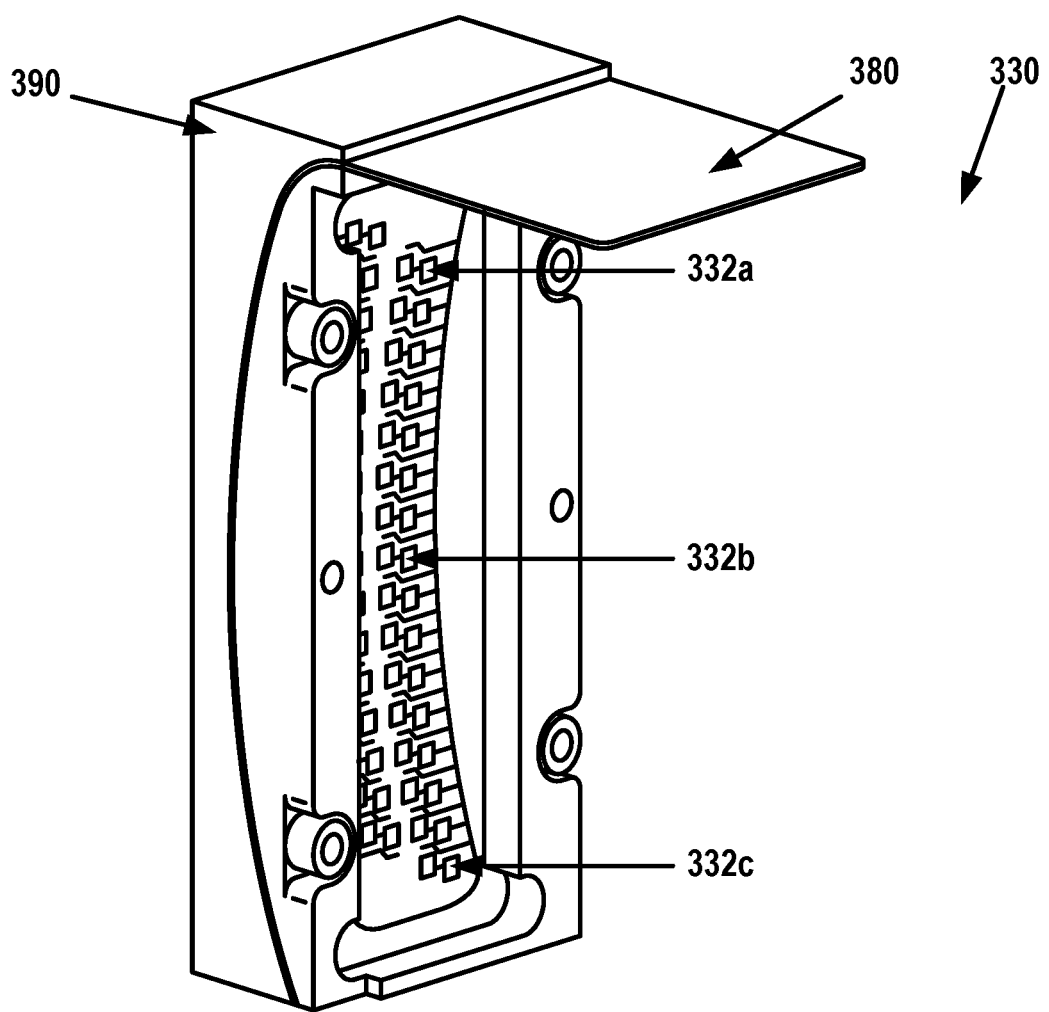
FIG. 3A illustrates a LIDAR receiver, according to an example embodiment.
Figure 3B:
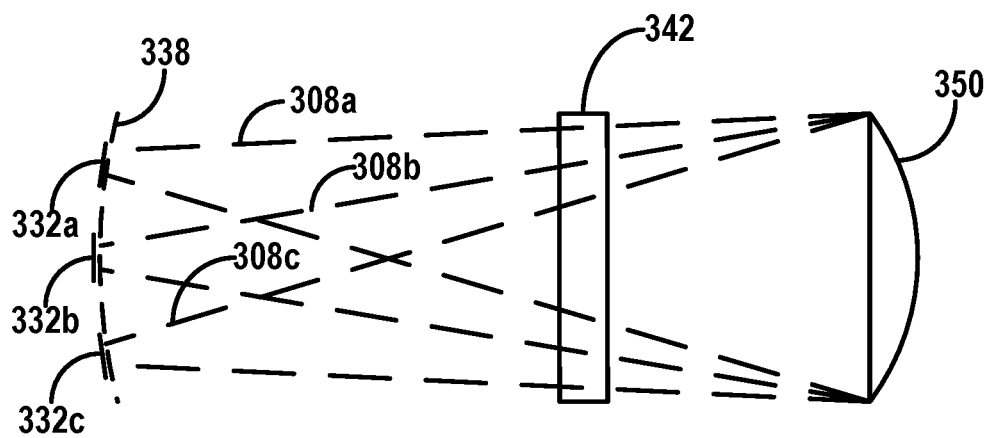
FIG. 3B illustrates a side view of three detectors in the receiver of FIG. 3A.

FIG. 3A illustrates a LIDAR receiver 330, according to an example embodiment. FIG. 3B illustrates a side view of three detectors 332a-c included in the receiver 330 of FIG. 3A. Receiver 330 may be similar to the receiver 130. For example, as shown, the receiver 330 includes a plurality of detectors 332a-c arranged along a curved surface 338 defined by a lens 350 that are similar, respectively, to the receiver 130, the detectors 132a-c, the curved plane 138, and the lens 150. Focused light 308a-c from lens 350 propagates along a receive path that includes a reflective surface 342 onto the detectors 332a-c similarly to, respectively, the focused light 108a-c, the lens 150, the reflective surface 142, and the detectors 132a-c.

The receiver 330 may comprise a flexible substrate 380 on which the plurality of detectors 332a-c are arranged along the curved surface 338. The flexible substrate 380 may be conformed to the curved surface 338 by being mounted to a receiver housing 390 having the curved surface 338. As shown, the curved surface 338 includes the arrangement of the detectors 332a-c curved along a vertical and horizontal axis of the receiver 330.

In some examples, the number and/or arrangement of the detectors 332a-c may be different than shown in FIGS. 3A-3B. In a first example, the detectors 332a-c may be alternatively arranged along a linear or flat surface. In a second example, the receiver 330 may alternatively include only one detector, or may include another number of detectors. In a third example, one or more of the detectors in the receiver 330 can alternatively have different positions than the positions shown. In a fourth example, the detectors in the receiver 330 can be alternatively arranged such that a first distance between a first detector and a second detector (adjacent to the first detector) is different than a second distance between the second detector and a third detector (adjacent to the second detector). Other examples are possible.

II. Example Optics Alignment Systems

Example systems for optics alignment will now be described in greater detail. The example systems described herein can be employed with various types of LIDAR devices, such as LIDAR device 100 for example, as well as other LIDAR device configurations.

Figure 4:
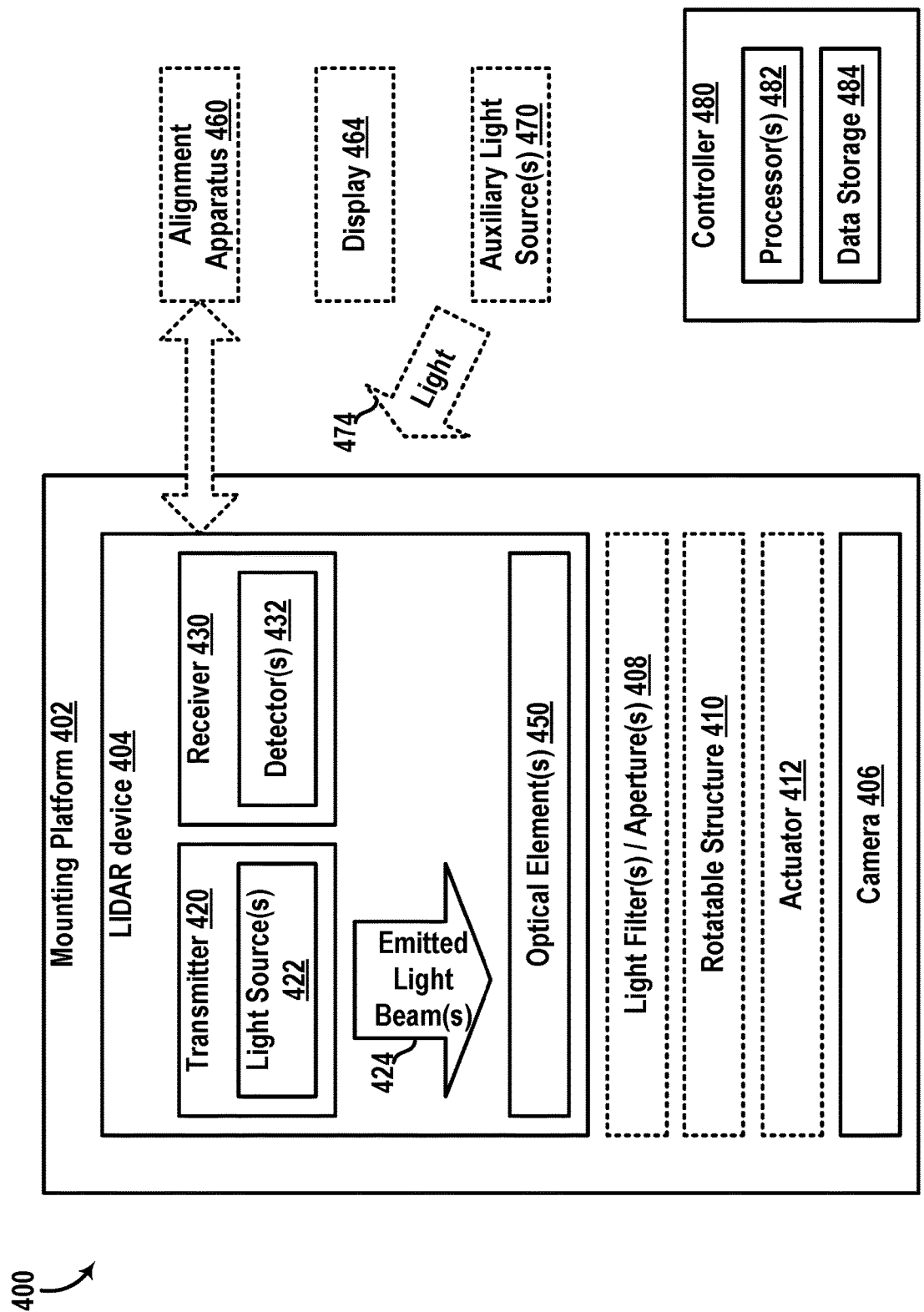
FIG. 4 is a block diagram of a system, according to an example embodiment.

FIG. 4 is a block diagram of a system 400, according to an example embodiment. As shown, the system 400 includes a mounting platform 402 and a controller 480. The system 400 may also optionally include an alignment apparatus 460, a display 464, and one or more auxiliary light sources 470.

The mounting platform 402 may comprise a platform for mounting some or all of the components of the system 400. As shown, for example, a LIDAR device 404 and a camera 406 could be mounted to the platform 402. In some examples, the mounting platform 402 may also support one or more light filters (and/or apertures) 408, a rotatable structure 410, and/or an actuator 412. Accordingly, the mounting platform 402 may be formed from one or more solid materials suitable for supporting the various components, such as plastics or metals among other possibilities. Additionally or alternatively, the mounting platform 402 may include one or more structures arranged to support the various components of system 400 in a particular arrangement. In some examples, some of the components shown to be mounted on the mounting platform 402 may alternatively be mounted to a separate structure (not shown) or otherwise coupled to the system 400. For instance, the camera 406 and/or the light filter(s) 408 may be alternatively positioned and/or mounted outside the mounting platform 402.

The LIDAR 404 may be similar to the LIDAR 100. For example, as shown, the LIDAR 404 includes a transmitter 420, a receiver 430, and one or more optical elements 450.

The transmitter 420 includes one or more light sources 422 that may be configured to emit one or more light beams 424, similarly to transmitters 120, 220, light sources 122*a-c*, 222*a-c*, and light beams 104, 204, for example.

The receiver 430 includes one or more detectors 432 that may be configured to receive light from an environment of the LIDAR 404, similarly to the detectors 132*a-c*, 332*a-c* of receivers 130, 330, for example.

Optical element(s) 450 may include any combination of lenses, mirrors, light filters, or any other optical element that directs, focuses, collimates, or otherwise manipulates emitted light beams 424 and/or light received from the environment of the LIDAR 404.

In some examples, optical element(s) 450 may include one or more lenses configured to collimate, focus, direct, or otherwise optically condition the emitted light beams 424 and/or light received from the environment of the LIDAR 404. In one embodiment, optical element(s) 450 may include a single lens having an optical power to both collimate the light beams 424 and focus received light onto the detectors 432, similarly to lenses 150 and/or 350 for example. In another embodiment, optical element(s) 450 may include two separate lenses. For example, a first lens may collimate the light beam(s) 424 emitted by the light source(s) 422, and a second lens may focus light propagating toward the LIDAR device 404 onto the detector(s) 432. Other lens configurations are possible as well (e.g., multiple lenses for collimation and/or multiple lenses for focus, etc.).

In some examples, optical element(s) 450 may include one or more mirrors or reflective devices that adjust a path of emitted light beams 424 and/or received light beams focused toward detector(s) 432, similarly to mirrors 124 and/or 142 for instance.

In some examples, optical element(s) 450 may include a light filter, half-mirror, or any other device that selectively transmits or reflects light incident thereon, similarly to light filter 134 for instance. Other types of optical elements are possible as well.

In some examples, the LIDAR 404 may include additional, fewer, or different components than those shown. Thus, in some embodiments, the system 400 may be utilized for assembly, manufacture, and/or calibration of various LIDAR devices having various configurations, such as the configuration of the LIDAR 404 or any another LIDAR device configuration. To facilitate such calibration or assembly, for example, the LIDAR 404 may be removably mounted to the mounting platform 402.

In some examples, the various components of the LIDAR 404 such as the transmitter 420, the receiver 430, and the optical element(s) 450 can be removably or adjustably mounted within the LIDAR 404. To that end, the system 400 may adjust the mounting positions of the transmitter 420 and the receiver 430 relative to one another to align the one or more light sources 422 with the one or more detectors 432. In some examples, the system 400 may be configured to adjust positions of various components of the transmitter 420 (e.g., light sources 422) and/or the receiver 430 (e.g., detectors 432) relative to one another.

The camera 406 may be any camera (e.g., a still camera, a video camera, etc.) configured to capture images of the LIDAR 404. In some examples, the camera 406 may be located at a given position at which the camera 406 can image the light beams 424 emitted by the one or more light sources 422, and can image the one or more detectors 432 (e.g., via the optical element(s) 450). In one embodiment, the camera 406 may be focused at or near infinity when capturing such images.

Generally, a camera focus setting of "infinity" may allow a camera to obtain a sharp (e.g., "in-focus") image of a distant object. For instance, light from the distant object may resemble substantially parallel light beams incident on a camera lens of the camera. Further, the camera focus setting of "infinity" may correspond to a setting where the substantially parallel light beams are focused onto a focal plane of the camera. As a result, the camera can obtain a relatively sharp (e.g., "in-focus") image of the distant object. Whereas, for instance, closer objects may appear "out-of-focus" (e.g., blurry, etc.) in the image associated with the infinity focus setting.

Thus, in the context of system 400 for example, the camera 406 may be mounted to have a field-of-view along the path of the light beams 424 exiting the LIDAR 404 (e.g., facing a lens of optical element(s) 450). Further, in this example, the optical element(s) 450 may be configured to collimate light beams 424 (e.g., into a plurality of substantially parallel light beams). Thus, in this example, a camera focus setting of "infinity" may allow the camera 406 to capture an image in which the light sources 422 appear to be "in-focus."

In other examples however, the camera 406 can be alternatively configured to obtain the image of the detectors 432 (and/or the light sources 422) while the camera is focused according to another focus setting (e.g., other than being focused at or near infinity).

In one embodiment, the system 400 may be configured to cause the light sources 422 to emit the light beams 424 toward the camera 406. In turn, the camera 406 may provide a first image of the light beams 424. The first image, for instance, may indicate (e.g., bright pixels in the first image, etc.) a view of the light source(s) 422. For example, where the camera 406 is mounted outside the LIDAR 404 (e.g., adjacent to LIDAR lens 150, 350, 450, etc.), the first image may indicate measured positions of the light beams 424 as viewed by the camera 406 via the optical element(s) 450. In the scenario, the camera may also obtain a second image indicative of measured detector position(s) of the detector(s) 432 (as viewed by the camera 406 via optical element(s) 450, lenses 150, 350, etc.).

The light filter(s) (and/or aperture(s)) 408 may be optionally included in the system 400 to facilitate capture and/or processing of the images described above. To that end, light filter(s) 408 may include any combination of optical elements that selectively transmit light incident thereon.

In a first example, the light filters 408 may comprise a first light filter that is positioned along a path of the light beams 424 between the LIDAR device 404 and the camera 406 while the camera is obtaining an image of the light beams. In this example, the first light filter may be configured to attenuate light within a wavelength range that includes the source wavelength of the light source(s) 422. The attenuation of the light may facilitate contrasting pixels in the image of the light beams 424 against surrounding pixels, for instance. Further, for instance, the attenuation may protect the camera 406 from the intensity of the light beams 424.

In a second example, the light filters 408 may comprise a second light filter configured to attenuate wavelengths other than the source wavelength of the light beams 424. In this example, an image obtained by the camera 406 (through the second light filter) may represent various components (e.g., light source(s) 422, detector(s) 432, etc.) of the LIDAR 404 more clearly due to the attenuation of background light having these attenuated wavelengths.

In a third example, the light filters 408 may comprise a third filter that reduces or modifies the intensity of a broad range of wavelengths of light, such as a neutral-density (ND) filter for instance. With an ND filter, for instance, the intensity for both the light beams 424 and background light can be attenuated to mitigate effects such as glare, overexposure, internal cavity reflections (e.g., unintended reflections along walls of housing 110 of LIDAR 100, etc.).

In a fourth example, the light filters 408 may comprise a fourth light filter that defines a first aperture configured to be interposed between the LIDAR device 404 and the camera 406 at a first position relative to the camera while the camera is obtaining an image of the detectors 432. For instance, the fourth light filter may comprise an opaque material (e.g., opaque to a wavelength range that includes the source wavelength of the light beams 424, etc.) surrounding an opening or a transparent material (e.g., transparent to the wavelength range including the source wavelength). In this instance, the opening or transparent material may correspond to the first aperture. Further, in some implementations, when the first aperture is interposed between the LIDAR device 404 and the camera 406, the first position of the first aperture may correspond to a predefined offset position relative to an optical axis of the camera 406 (or a camera lens thereof). As such, an image captured by the camera 406 while the first aperture is at the first position may indicate distorted positions, shapes, sizes, etc., of the detectors 432.

In a fifth example, the light filter(s) 408 may comprise a fifth light filter that defines a second aperture configured to be interposed between the LIDAR device 404 and the camera 406 at a second position (different than the first position of the first aperture) while the camera is obtaining another image of the detectors 432. As such, another image captured by the camera 406 while the second aperture is at the second position may indicate different distorted positions, shapes, sizes, etc., of the detectors 432.

In some implementations, the system 400 can determine information about the alignment of the receiver 430 by comparing the respective distortions indicated by the two images associated with the first aperture and the second aperture. For example, the first position of the first aperture may correspond to a first offset position in a first direction from an optical axis of the camera, and the second position of the second aperture may correspond to a second offset position in a second direction from the optical axis (e.g., opposite to the first direction). In this example, the distortions in a first image associated with the first aperture may be exaggerated near one end of the first image, and the distortions in a second image associated with the second aperture may be exaggerated near an opposite end of the second image. Thus, for instance, the system 400 can determine an indication of depth distances between the camera 406 and the detectors 432 by comparing the distorted locations of the detectors 432 in the first image with the distorted locations of the detectors 432 in the second image.

Other configurations of the light filter(s) 408 (and/or alignment offset determinations based on a comparison of images captured by the camera 406) are possible as well, and are described in greater detail within exemplary embodiments herein.

Additionally, various implementations of the system 400 are possible to facilitate interposing a particular aperture or light filter of the light filters 408 between the LIDAR 404 and the camera 406. In one example, the system 400 may include a robotic device (not shown) or other mechanical device configured to move the particular aperture to a given position between the LIDAR 404 and the camera 406 (and/or to remove the particular aperture from the given position). Thus, in some examples, a first aperture or light filter can be replaced with a second (physically separate) aperture or light filter between image capture events.

Alternatively or additionally, in some examples, the LIDAR device 404 and the camera 406 can be mounted in fixed positions, and one or more characteristics of a particular aperture or light filter (interposed between the LIDAR device 404 and the camera 406) can be adjusted between image capture events.

In a first example, an aperture (e.g., slit, etc.) can be moved in a linear direction (relative to the LIDAR device 404 and the camera 406) from a first position to a second position. Thus, for instance, a single structure defining the aperture can be used to obtain a first image when the aperture is in the first position (relative to the LIDAR device 404 and the camera 406), and to obtain a second image after the aperture (and/or the single structure) is moved to the second position.

In a second example, an aperture (or light filter) can be rotated to modify a position and/or orientation of the aperture (relative to the LIDAR device 404 and the camera 406). For instance, distortion characteristics of an image captured through the aperture may vary depending on the orientation of the aperture when the image was captured through the aperture. Further, for instance, filtering characteristics (e.g., polarization of filtered light, etc.) of a light filter may vary depending on the orientation of the light filter.

In a third example, a size and/or shape of an aperture (or light filter) can be dynamically adjusted between image capture events. For instance, an aperture can be physically implemented as a re-sizeable region defined by an adjustable structure (e.g., shutter, sliding structure at least partially overlaid on a slit, etc.). To that end, the adjustable structure may be configured to dynamically adjust or modify the size, shape, or position of the aperture (e.g., size of slit or cavity, exposed portion of the re-sizeable region, etc.). Other examples are possible.

Thus, in some implementations, one or more of the light filters 408 can be physically implemented as a single structure that is adjusted (e.g., moved, resized, etc.) between image capture events. Alternatively or additionally, in some implementations, one or more of the light filters 408 can be physically implemented within one or more respective interchangeable structures, and a particular structure of the interchangeable structures can then be selected, actuated, etc., to interpose a particular aperture or light filter (disposed in the particular structure) between the LIDAR device 404 and the camera 406.

In one particular embodiment, the rotatable structure 410 may be optionally included in the system 400 to facilitate interposing a particular aperture or light filter of the light filters 408 between the LIDAR device 404 and the camera 406. For example, the rotatable structure 410 may support an arrangement of the light filters 408. In this example, the rotatable structure 410 may rotate about an axis thereof. Further, a given configuration of the rotatable structure 410 (e.g., position or orientation about the axis) may correspond to a given light filter of the light filters 408 being interposed between the LIDAR device 404 and the camera 406. For instance, the rotatable structure may be configured to resemble a fan assembly, where each blade of the fan assembly has a window in which a corresponding filter (or aperture) of the light filters 408 is disposed. To that end, the rotatable structure 410 may include any combination of solid materials suitable for supporting the light filters 408.

The actuator 412 may be optionally included in the system 400. The actuator 412 may be configured to adjust the position of the light filter(s) 408. For instance, the actuator 412 may be configured to arrange the light filter(s) 408 to a first configuration where a first light filter is interposed between the LIDAR 404 and the camera 406, a second configuration where a second light filter is interposed between the LIDAR 404 and the camera 406, or a third configuration where none of the light filters 408 are not interposed between the LIDAR 404 and the camera 406, among other possibilities. For instance, the actuator 412 may be configured to rotate the rotatable structure 410 about an axis. In other instances, the actuator 412 may be used in the operation of the robotic device discussed above. A non-exhaustive list of example actuators may include motors, stepper motors, pneumatic actuators, hydraulic pistons, relays, solenoids, and piezoelectric actuators, among other possibilities.

The system 400 can optionally include the alignment apparatus 460 to adjust the relative mounting positions of the transmitter 420 and/or the receiver 430 in the LIDAR device 404. To that end, the alignment apparatus 460 may include any device that couples to one or more of the components in the LIDAR device 404. For example, the alignment apparatus 460 may be a robotic arm that physically couples to the receiver 430 to rotate and/or translate the mounting position of the receiver 430 in the LIDAR 404. Alternatively or additionally, for example, the robotic arm may adjust the mounting position of the transmitter 420. In some examples, the alignment apparatus 460 may adjust the relative position between the transmitter 420 and the receiver 430 based on image(s) obtained using the camera 406. For instance, the alignment apparatus 460 may adjust the relative position to align one or more of the light beams 424 emitted by the light sources 422 with one or more of the detectors 432.

In one embodiment, the alignment apparatus 460 may include a shaft coupler (e.g., shaft coupling apparatus, etc.) as an interface between an actuator (e.g., servomotor, etc.) and the transmitter 420 or receiver 430. For example, the shaft coupler may mitigate unintended motion of the transmitter or receiver during alignment (e.g., due to parallel, angular, or axial forces associated with twisting or moving the shaft that mounts the transmitter or receiver to the LIDAR device). For example, in a scenario where the alignment apparatus 460 is adjusting a mounting position of the receiver 430 in the LIDAR 404, the shaft coupler may mitigate alignment errors due to axial compression and non-planarity between the receiver 430 and a housing (e.g., housing 110) of the LIDAR 404.

The components (i.e., the transmitter 420 and the receiver 430) of the LIDAR device 404 may each be adjustable with six degrees of freedom (DOF). In some examples, the alignment apparatus 460 may adjust the relative positions of the transmitter 420 and the receiver 430 by adjusting some or all of the six DOF (e.g., x, y, z, roll, pitch, and/or yaw) of the mounting position of one or both of the transmitter 420 and the receiver 430.

The system 400 may optionally include display 464 to display information about the images captured by the camera 406 and/or alignment offsets computed based on the captured images. To that end, display 464 may include any type of display (e.g., liquid crystal display, LED display, etc.). Thus, for instance, the display 464 may have a graphical user interface (GUI) for displaying and/or interacting with images captured by the camera 406, and a human operator or a computer operator may interface with the GUI to adjust the relative mounting positions of the transmitter 420 and the receiver 430 by manipulating the images in the GUI.

The system 400 may optionally include one or more auxiliary light sources 470 that emit light 474 at the source wavelength (the wavelength of emitted light beams 424) to illuminate the receiver 430. To that end, for example, the structure and form of the auxiliary light source(s) 470 may be similar to the light sources 422 (e.g., LED, etc.). For instance, where the camera 406 is configured to capture images of the detectors 432, the auxiliary light source 470 may illuminate the detectors 432 to facilitate the camera 406 obtaining an image of the detectors 432 while also focused at or near infinity for the source wavelength of the light beams 424. By way of example, the light 474 (or a portion thereof) emitted by auxiliary light source(s) 470 may reflect off the detectors 432 toward a lens (e.g., optical element(s) 450) of the LIDAR 404. Further, in this example, at least a portion of the reflected light 474 from the detectors 432 may be collimated by the lens 450 (similarly to the collimated light beams 424). Thus, as discussed above with respect to the image of the light sources 422, the camera 406 (while focused at or near infinity) may similarly capture a relatively sharp (e.g., "in-focus") image of the detectors 432.

In one embodiment, the auxiliary light source(s) 470 may be positioned to emit light that illuminates the detectors 432 prior to propagating through a light filter adjacent to the detectors 432. Referring back to FIG. 1B for example, a first auxiliary light source can be positioned to illuminate detectors 132a-132c through a cavity at a first side of receiver 130 along the page (e.g., cavity along x-y plane) between the light filter 134 and the detectors 132a-132c. Similarly, for example, a second auxiliary light source can be positioned to illuminate the detectors 132a-132c through a cavity along a second side of receiver 130 (not shown) opposite to the first side. With this arrangement, for instance, reflections, refractions, or other optical manipulations (caused by the light filter 134) of the light emitted by the auxiliary light sources can be reduced or prevented to facilitate illuminating the detectors 132a-132c in a relatively more uniform manner. Additionally or alternatively, in some implementations, one or more light diffuser(s) can be coupled to the auxiliary light source(s) 470 to provide a relatively more uniform illumination of the detectors 132a-132c.

In some examples, a particular light filter of light filters 408 may be configured to remain interposed between the camera 406 and the LIDAR device 404 during capture of the image of the light beams 424 and during capture of one or more images of the detectors 432. For example, the particular light filter may correspond to a light filter that attenuates background light, while allowing at least some of the light at the source wavelength of the light 424 and/or 474 to propagate toward the camera. In these examples, the illuminating light 474 from the auxiliary light source 470 together with the particular light filter may thus allow the system 400 to reduce the background noise from the images captured by the camera 406.

The controller 480 may include one or more processors 482 configured to operate some or all of the components of the system 400 in line with the discussion above. To that end, the controller 480 may be coupled to the various components via a wired or wireless interface (not shown). For example, the controller 480 may execute program functions stored in a non-transitory computer readable medium (e.g., data storage 484) to cause the system 400 to perform various functions and processes of the present method. To that end, processor 482 may comprise one or more general-purpose processors and/or one or more special purpose processors. To the extent that processor 482 includes more than one processor, such processors could work separately or in combination. Data storage 484, in turn, may comprise one or more volatile and/or one or more non-volatile storage components, such as optical, magnetic, organic storage, and/or other types of non-transitory computer readable media. Further, in some embodiments, data storage 484 may be integrated in whole or in part with processor 482. In some embodiments, data storage 484 may contain instructions (e.g., program logic) executable by processor 482 to cause system 400 and/or components thereof to perform the various operations described herein. Thus, in one embodiment, controller 480 may be implemented as or may comprise a computing device that communicatively coupled to one or more components of system 400 (e.g., light sources 470, display 464, alignment apparatus 460, LIDAR 404, camera 406, actuator 412, etc.). Alternatively or additionally, in some embodiments, the controller 480 may include analog and/or digital circuitry wired to perform one or more of the functions described herein.

In a first example, the controller 480 may cause a power source (not shown) to provide power to the various components of the system 400. In a second example, the controller 480 may cause the transmitter 420 of the LIDAR 404 to emit the light beams 424. In a third example, the controller 480 may operate actuator 412 to position one or more of the light filters 408 between the LIDAR 404 and the camera 406. In a fourth example, the controller 480 may operate the camera 406 to obtain an image of the light beams 424 and one or more images of the detectors 432 in line with the discussion above. In a fifth example, the controller 480 may operate the alignment apparatus 460 to adjust the mounting position of the transmitter 420 and/or the receiver 430 in the LIDAR 404. In a sixth example, the controller 480 may operate the alignment apparatus 460 to mount (or unmount) various components of the system 400 (e.g., LIDAR 404, etc.) to the mounting platform 402. In a seventh example, the controller 480 may operate the auxiliary light source(s) 470 to illuminate the receiver 430 with light 474. In an eighth example, the controller 480 may operate the display 464 to display an indication of the alignment offsets between the transmitter 420 and the receiver 430. Other examples are possible.

The system 400 may include additional, fewer, or different components than those shown, and may perform other functions as well, in accordance with the present disclosure.

Figure 5:
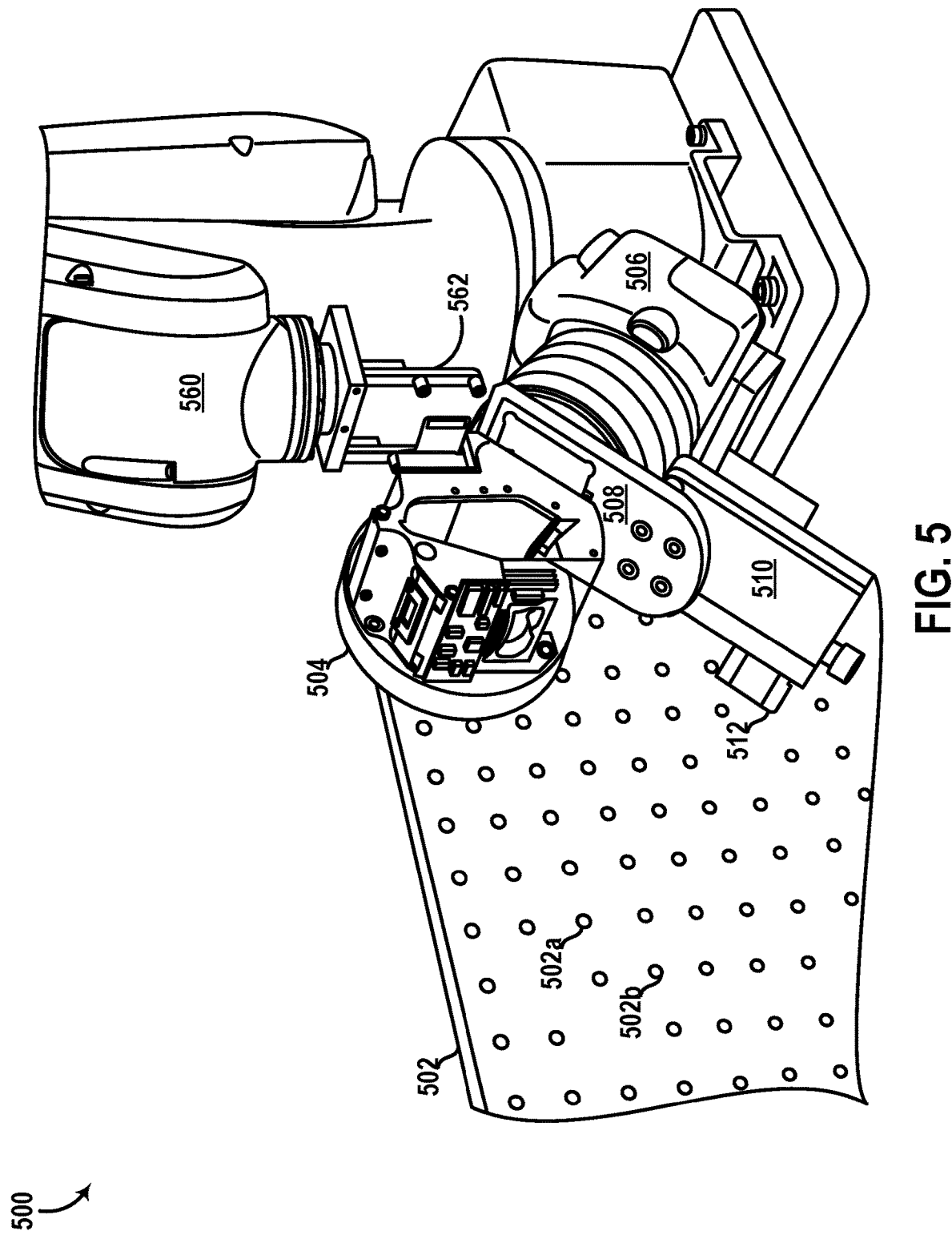
FIG. 5 illustrates another system, according to an example embodiment.

FIG. 5 illustrates a system 500, according to an example embodiment. The system 500 may be similar to the system 400. For example, as shown, the system 500 includes a mounting platform 502, a LIDAR 504, a camera 506, a light filter 508, and an alignment apparatus 560 that can be similar, respectively, to the mounting platform 402, the LIDAR 404, the camera 406, the light filter 408, and the alignment apparatus 460. As shown, the system 500 also includes a mounting structure 510, an actuator 512, and a shaft coupler 562.

The mounting structure 510 may be formed from any solid material (e.g., metal, plastic, etc.) similarly to the mounting platform 502, and may be shaped to facilitate coupling one or more of the components of the system 500 to the mounting platform 502. As shown, for example, the mounting structure 510 couples the camera 506 and the light filter 508 to the mounting platform 502. However, in some examples, a separate mounting structure may be utilized for each of the camera 506 and the light filter 508. Further, in some examples, one or more additional mounting structures (not shown) can alternatively couple the LIDAR 504 to the mounting platform 502.

The actuator 512 may be configured to adjust a position of the light filter 508. Example actuators may include motors, stepper motors, pneumatic actuators, hydraulic pistons, relays, solenoids, and piezoelectric actuators among other possibilities.

The shaft coupler 562 may include a coupling device configured to couple the alignment apparatus 502 with one or more components of the LIDAR 504. In line with the discussion above, the system 500 may adjust a mounting position of a transmitter (not shown) and/or a receiver (not shown) in the LIDAR 504. For instance, the alignment apparatus 560 (e.g., robotic arm, etc.) may adjust the relative position between the transmitter and the receiver by adjusting the position of the shaft coupler 562 or changing the orientation of the shaft coupler 562, among other possibilities.

As shown, the mounting platform 502 includes a plurality of holes, exemplified by holes 502a and 502b. In some embodiments, one or more components of the system 500, such as the LIDAR 504, the camera 506, and/or the light filter 508 for instance, may be mounted to the mounting platform 502 by coupling the various components to such holes in the mounting platform (e.g., by fastening a bolt through the holes). In other embodiments, the various components may be mounted to the mounting platform 502 via other processes or devices (e.g., intermediate support structures, etc.). In one example, the various components may be mounted to the mounting platform 502 via an application of an adhesive among other possibilities. In another example, one or more mounting structures may couple one or more of the components to the mounting platform 502. For instance, as shown in FIG. 5, the mounting structure 510 may be coupled to the mounting platform 502 (e.g., by fastening a bolt to one of the holes, etc.), and may also be coupled to the camera 506 and the light filter 508 to provide particular positions of the camera 506 and the light filter 508 relative to the mounting platform 502. Other configurations and shapes of the mounting structure 510 are possible.

Further, as shown, the LIDAR 504 has a configuration similar to the LIDAR 100. However, in some examples, other configurations are possible for the LIDAR 504.

An example scenario for operation of the system 500 is as follows. First, as shown, the LIDAR 504 may be mounted to the mounting platform 502 to have a field-of-view (FOV) through which light emitted by a transmitter (not shown) of the LIDAR 504 and light received by a receiver (not shown) of the LIDAR 504 propagates. For instance, the LIDAR 504 may be mounted to the mounting platform 502 using the alignment apparatus 560 (e.g., robotic arm, etc.) or any other device (e.g., mechanical tool, etc.). Next, the camera 506 may be located at a given position relative to the LIDAR 504 such that the camera 506 may obtain image(s) of the receiver (not shown) of the LIDAR 504 and/or image(s) of light emitted by the transmitter (not shown) of the LIDAR 504.

Continuing with the scenario, the camera 506 may be focused to infinity for the source wavelength (e.g., 905 nm) of the light emitted by the LIDAR 504. Next, the light filter 508 may be positioned at a first position to be interposed between the LIDAR 504 and the camera 506 along the FOV of the LIDAR 504. For instance, the actuator 512 may be configured to move the light filter 508 to the first position shown in FIG. 5.

Continuing with the scenario, the system 500 may then cause the transmitter (not shown) of the LIDAR 504 to emit one or more light beams through the light filter 508 and toward the camera 506. Referring back to FIG. 1B by way of example, the light beams may correspond to the light beams 104a-c propagating out of the lens 150. Next, the camera 506 may obtain a first image of the light beams emitted by the LIDAR device 504. Continuing with the example of FIG. 1B, the first image may indicate light source positions of light sources 122a-c (e.g., measured positions of the light beams 104a-104c). At this point in the scenario, the system may then cause the LIDAR device 504 to stop emitting the light beams.

Continuing with the scenario, the system may then cause the actuator 512 to move the light filter 508 to a second position where the light filter 508 is not interposed between the camera 506 and the LIDAR 504. The camera 506 may then obtain a second image. The second image may indicate measured detector positions of detectors in a receiver (not shown) of the LIDAR 504. Referring back to FIG. 1B for example, the second image may represent the detector positions of detectors 132a-c that are viewable to the camera 506 via mirror 142 and lens 150.

Continuing with the scenario, the system 500 may then determine at least one offset based on the first image and the second image. In one instance, the at least one offset may include distances between adjacent light sources and/or adjacent detectors of the LIDAR device 504. In another instance, the at least one offset may relate to offsets between the emitted light beams and corresponding detectors of LIDAR 504. Other offsets are possible as well.

In some examples, the system 500 may determine the at least one offset based on a simulation of the optical arrangement of LIDAR 504. Referring back to FIG. 1B for example, a computing device (e.g., controller 480 of system 400) may simulate emission of light beams 104a-104c based on optical characteristics of lens 150 and reflector 124. Further, the computing device may simulate reflection of light beams 104a-104c (as reflected light 106) off an object at a particular distance (e.g., 100 meters, etc.) from the LIDAR. The computing device may then determine simulated detector positions (e.g., expected locations) for intercepting focused light 108a-108c based on at least the optical characteristics of lens 150, mirror 142, and filter 134. The computing device may then compare the simulated detector positions with the measured detector positions indicated by the first and second images; and the computing device may then determine the at least one alignment offset based on the comparison.

Continuing with the scenario of FIG. 5, the alignment apparatus 560 (e.g., robotic arm, etc.) may couple to the transmitter (not shown) and/or the receiver (not shown) of the LIDAR device 504 via the shaft coupler 562, or via one or more other manipulators (not shown). The alignment apparatus 560 may also adjust the relative position between the transmitter and the receiver in accordance with the determined at least one alignment offset.

The transmitter and/or the receiver of the LIDAR device 504 may be adjustable with up to six degrees of freedom (DOF). Three of the six DOF are translational: forward/backward (e.g., linearly along a z-axis that extends through the LIDAR device 504 and the camera 506), up/down (e.g., linearly along y-axis perpendicular to the z-axis), and left/right (e.g., linearly along an x-axis perpendicular to the z-axis and the y-axis). Further, three of the six DOF are rotational: pitch (e.g., rotation about the x-axis), yaw (e.g., rotation about the y-axis), and roll (e.g., rotation about the z-axis).

Thus, continuing with the scenario, the system 500 may adjust the mounting position of the transmitter and/or receiver in the LIDAR device 504 by adjusting the forward/backward position, the up/down position, the left/right position, the pitch, the yaw, and/or the roll thereof in line with the discussion above. Through this process, for example, the system 500 may align one or more light sources in the transmitter of the LIDAR device 504 with one or more corresponding detectors in the receiver of the LIDAR device 504.

In some embodiments, the system 500 may then decouple the shaft coupler 562 from the LIDAR device 504, and the transmitter/receiver arrangement in the LIDAR device 504 may be configured to remain at the alignment (e.g., relative position) performed by the alignment apparatus 560. By way of example, the system 500 may apply an epoxy or other adhesive to maintain the transmitter and/or receiver of the LIDAR device 504 at the respective aligned relative mounting position(s). In one implementation, the shaft coupler 562 may remain coupled to the LIDAR device 504 until the adhesive is cured. However, other processes are possible as well for maintaining the relative position between the transmitter and the receiver of the LIDAR device 504. For instance, the transmitter and/or receiver of the LIDAR device 504 may be fastened to a housing of the LIDAR device 504 using bolts, screws, etc.

It is noted that the scenario presented above is for exemplary purposes only. Other scenarios are possible as well that may include some or all of the components of the system 500, or may include additional or fewer processes than those described. A non-exhaustive list of example variations of the scenario is presented below.

In a first example, the system 500 may not include the light filter 508. For instance, the camera 506 may be configured to obtain the first image and the second image without the light filter 508 being interposed between the camera 506 and the LIDAR 504.

In a second example, the camera 506 and the light filter 508 may be mounted separately from the LIDAR 504. For instance, the system 500 may be implemented in an assembly line where multiple LIDAR devices similar to the LIDAR 504 are located on an assembly conveyor belt. In this instance, the camera 506, the light filter 508 and the robotic arm 560 may be mounted independently adjacent to the conveyor belt, and may perform similar functions to the scenario described above to calibrate each LIDAR device in the assembly line.

In a third example, a receiver of the LIDAR 504 (e.g., similar to receiver 430, etc.) may be illuminated by one or more auxiliary light sources (not shown) similar to the auxiliary light source(s) 470. For instance, the light filter 508 may remain interposed between the LIDAR 504 and the camera 506 while the first image of the laser beams emitted by the LIDAR 504 is captured by the camera 506, and while the second image of the receiver is captured as well. In this instance, the receiver of the LIDAR 504 would be visible to the camera 506 through the light filter 508 due to the illumination by the auxiliary light source(s) with light at the source wavelength which is viewable through the light filter 508.

In a fourth example, the LIDAR 504 may be configured to continue emitting light while the camera 506 captures the first image and the second image. For instance, the light filter 508 may alternatively or additionally attenuate the light beams having the source wavelength emitted by light sources of the LIDAR device 504.

In a fifth example, the camera 506 may be configured to capture a single image instead of the first image and the second image. The single image may be indicative of both the light source positions of light sources in the LIDAR 504, and the detector positions of detectors in the LIDAR 504. Referring back to FIG. 1B by way of example, the single image may capture both the light beams 104a-c and light reflected off the detectors 132a-c. As in the third example above, a receiver of the LIDAR 504 can optionally be illuminated by an auxiliary light source such that detectors therein are viewable through the light filter 508.

In a sixth example, the light filter 508 (and/or the mounting structure 510) can be replaced by an aperture selector (not shown) that is actuated (e.g., via actuator 512) to interpose one of a plurality of light filters or apertures between the camera 506 and the LIDAR 504, in line with the description of the system 400. For example, each light filter may define a different aperture at a different position. In turn, multiple images obtained by the camera 506 using different apertures may exhibit different distortions due to the associated apertures. Thus, the system 500 may determine alignment offsets between the light sources and the light detectors in the LIDAR 504 based on such distortions.

Figure 6A:
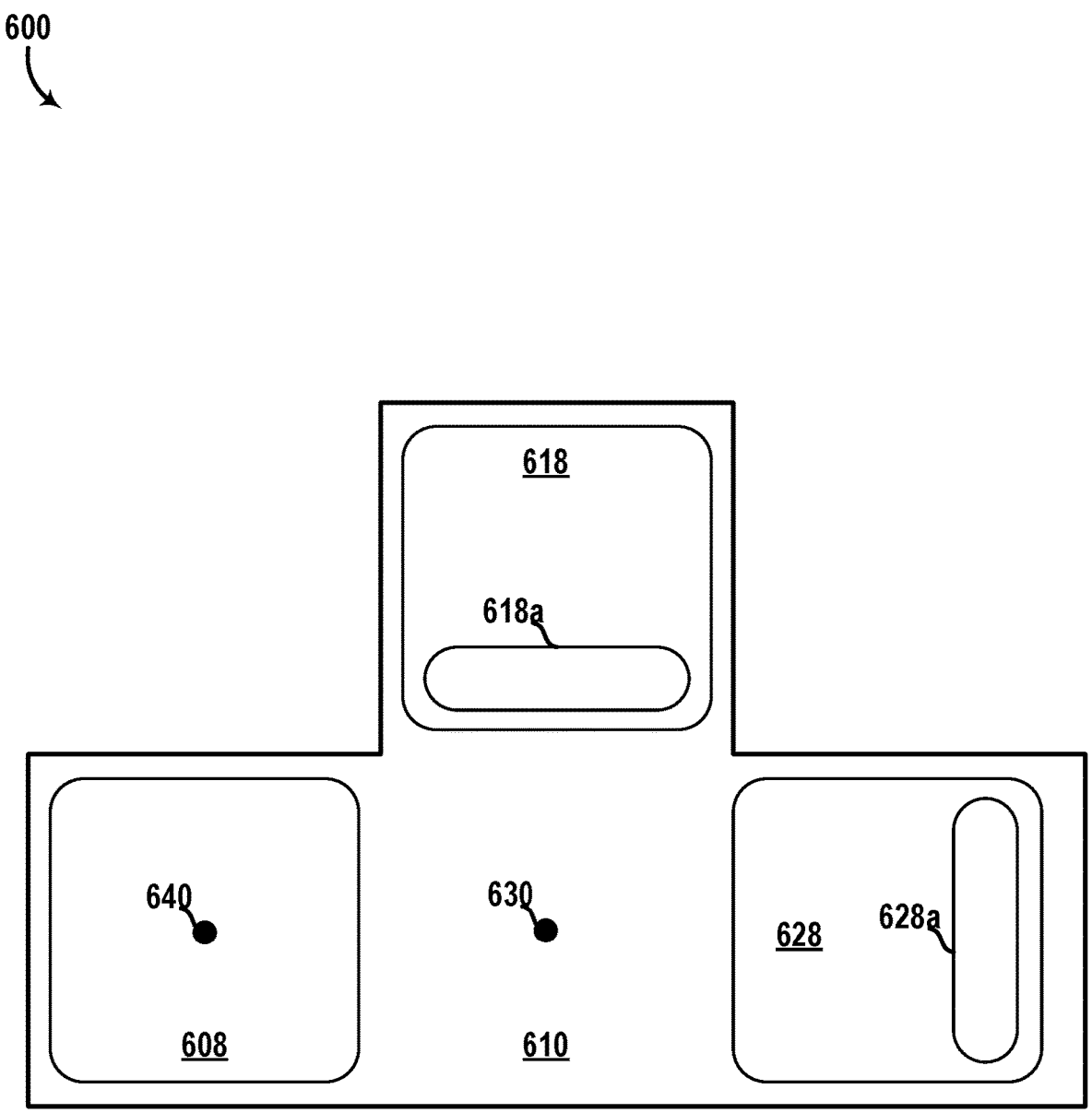
FIG. 6A illustrates an aperture selector in a first configuration, according to an example embodiment.

FIG. 6A illustrates an aperture selector 600 in a first configuration, according to an example embodiment. In some examples, the aperture selector 600 can be used with the system 500 instead of or in addition to the light filter 508. As shown, the selector 600 includes a rotatable structure 610 that includes a plurality of windows 608, 618, and 628 in a particular arrangement with respect to one another. The rotatable structure 610 may be similar to the rotatable structure 410 of the system 400, for example.

Accordingly, the windows 608, 618, 620 may comprise one or more light filters (and/or apertures) similar to the one or more light filters/apertures 408. To that end, the rotatable structure 610 can be actuated (e.g., via actuator 412 or 512) to a particular configuration associated with one of the windows 608, 618, 628 being interposed between the LIDAR device 404 and the camera 406. To facilitate this, for instance, the actuator (412 or 512) may be configured to rotate the rotatable structure 610 about an axis 630 (pointing out of the page).

As a variation of the scenario described in FIG. 5 for example, the first configuration shown in FIG. 6A may correspond to an orientation of the rotatable structure 610 (about axis 630) associated with the window 608 being interposed between the LIDAR device 504 and the camera 506. For instance, in the first configuration shown, an axis 640 (pointing out of the page) that extends through the LIDAR 504 and the camera 506 may intersect window 608. In one implementation, the axis 640 may correspond to an optical axis of the camera 506. In this scenario, a transmitter of the LIDAR 504 may emit light while the selector 600 is in the first configuration (shown) through the window 608 toward the camera 506. While the LIDAR 504 is emitting the light, the camera 506 may then capture an image indicating light source positions of light sources included in a transmitter of the LIDAR device 504.

To facilitate this, in one example, the window 608 may comprise a light filter (e.g., light filter(s) 408, 508, etc.) that attenuates light in a wavelength range that includes a source wavelength of the light emitted by the light sources of the LIDAR 504. By doing so, for instance, the light filter 608 may prevent damage to the camera 506 due to the high intensity of the light emitted by the transmitter of the LIDAR 504. In another example, window 608 may alternatively comprise a cavity (e.g., hole, opening, etc.) that allows the emitted light to propagate through the selector 600 toward the camera 506. Other examples are possible as well.

Next, in the scenario, selector 600 can be adjusted to a second configuration where the window 618 is interposed between the LIDAR 504 and the camera 506. For example, the actuator (412 or 512) may rotate the rotatable structure 610 about the axis 630 to the second configuration where the axis 640 intersects the window 618 instead of the window 608.

Figure 6B:
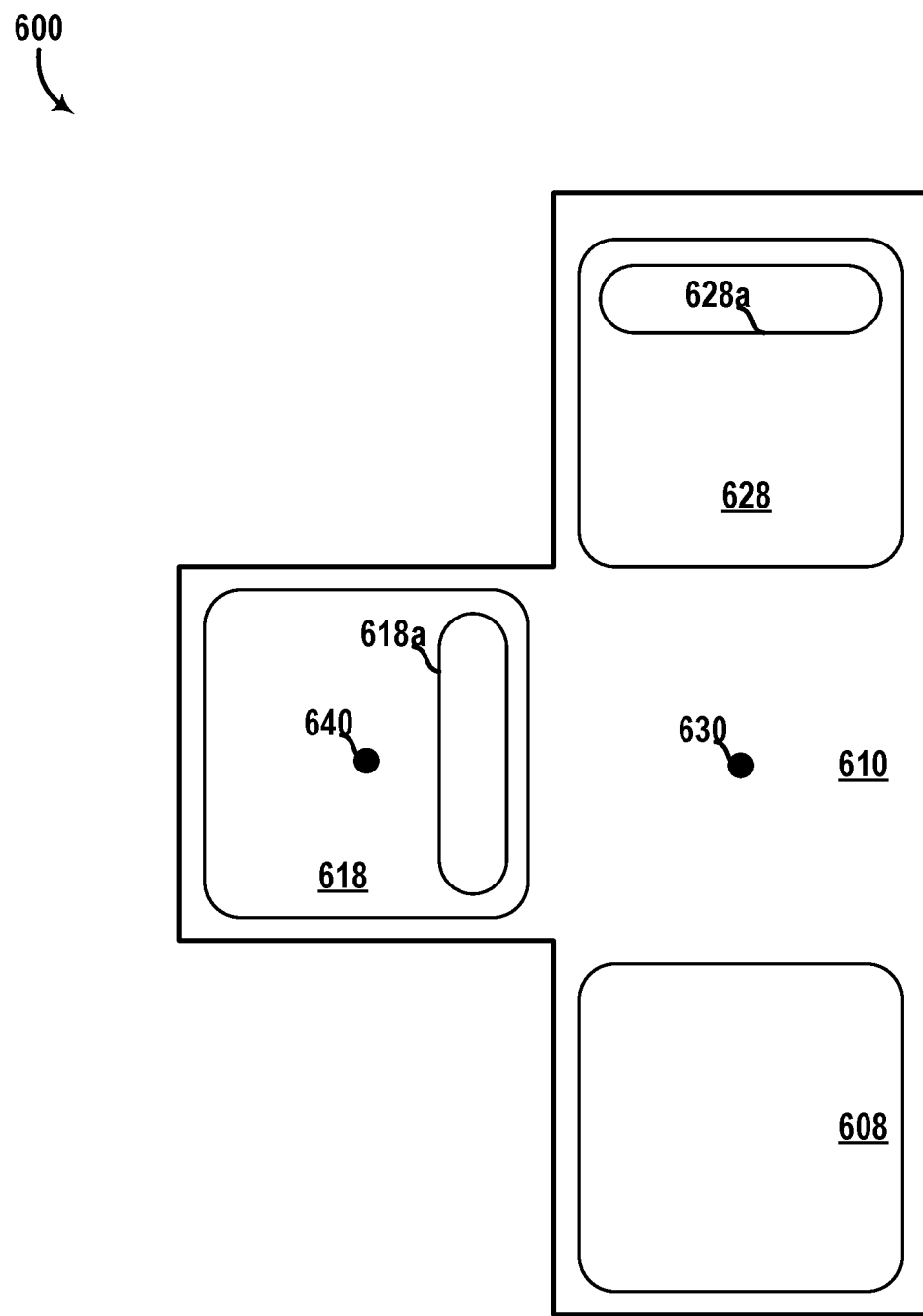
FIG. 6B illustrates the aperture selector of FIG. 6A in a second configuration.

FIG. 6B illustrates the selector 600 in the second configuration. As shown, for instance, the window 618 may comprise a light filter that defines a first aperture 618a at a first position relative to the axis 640 (and the camera 506). The first aperture 618a, for instance, may correspond to a region of the light filter 618 that has different light transmission characteristics than other (e.g., adjacent) regions of the light filter 618. In one example, the region 618a may correspond to a cavity (e.g., hole, opening, slit, etc.) within an opaque material of the light filter 618. In another example, alternatively to the opaque material, the regions of the light filter 618 adjacent to the aperture 618a may have material characteristics that attenuate light having the source wavelength of the light emitted by LIDAR 504 (and/or the auxiliary light source(s) 470).

Continuing with the scenario, while the selector 600 is at the second configuration of FIG. 6B for instance, the auxiliary light source(s) 470 may illuminate a receiver (e.g., 430) of the LIDAR device (e.g., 404, 504, etc.) at the source wavelength. The illuminated receiver can then be imaged by the camera 506 through the aperture 618. Thus, the camera 506 can capture another image indicating distorted positions of the light detectors in the LIDAR device 504. For instance, due to the offset position of the aperture 618a relative to the optical axis 640 of the camera 506, light propagating from light detectors closer to the aperture 618a may be focused differently than light propagating from light detectors further from the aperture 618a.

Next, in the scenario, selector 600 can be adjusted to a third configuration where the window 628 is interposed between the LIDAR 504 and the camera 506. For example, the actuator (412 or 512) may rotate the rotatable structure 610 about the axis 630 to the third configuration where the axis 640 intersects the window 628 instead of the window 618.

Figure 6C:
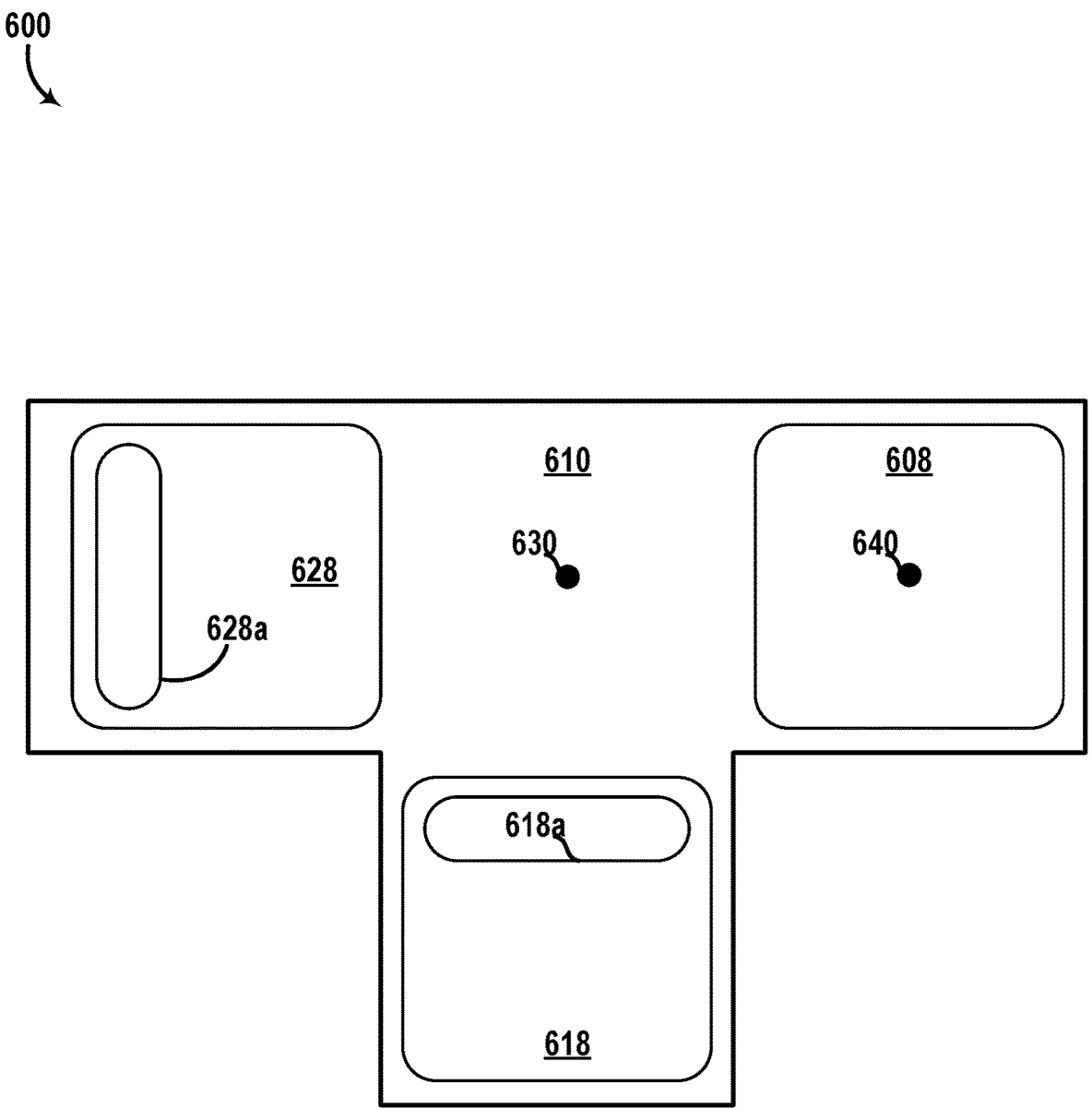
FIG. 6C illustrates the aperture selector of FIG. 6A in a third configuration.

FIG. 6C illustrates the selector 600 in the third configuration. As shown, for instance, the window 628 may comprise a light filter that defines a second aperture 628a at a first position relative to the axis 640 (and the camera 506). The second aperture 628a, for instance, may correspond to a region of the light filter 628 that has different light transmission characteristics than other (e.g., adjacent) regions of the light filter 628. In one example, the region 628a may correspond to a cavity (e.g., hole, opening, slit, etc.) within an opaque material of the light filter 628. In another example, alternatively to the opaque material, the regions of the light filter 628 adjacent to the aperture 628a may have material characteristics that attenuate light having the source wavelength of the light emitted by the LIDAR 504 (and/or the auxiliary light source 470).

Continuing with the scenario, while the selector 600 is at the third configuration of FIG. 6C, the auxiliary light source(s) 470 may illuminate a receiver (e.g., 430) of the LIDAR device (e.g., 404, 504, etc.). The illuminated receiver can then be imaged by the camera 506 through the aperture 628. Thus, the camera 506 can capture yet another image indicating different distorted positions of the light detectors in the LIDAR device 504. For instance, due to the different offset position of the aperture 628a relative to the optical axis 640 of the camera 506 (compared to the position of aperture 618a shown in FIG. 6B), light propagating from light detectors closer to the aperture 628a may be focused differently than light propagating from light detectors further from the aperture 628a.

Next, in the scenario, the system 500 can compare the images captured according to the configurations of FIGS. 6A, 6B, 6C to determine alignment offsets between the transmitter and receiver of the LIDAR device. For instance, the difference between distortions due to apertures 618a and 628a may vary for each detector depending on whether the detector is positioned closer or further from the camera 506. Thus, in one example, a depth misalignment may be associated with an extent of overlap between detector positions in the distorted images (obtained through apertures 618a and 628a) and the light source positions in the image of the emitted light beams (obtained via light filter 608). In another example, horizontal, vertical, roll, pitch, and/or yaw misalignments can also be determined based on the difference between offset detector positions indicated in the images obtained via apertures 618a and 628a. Other examples are possible as well and are described in greater detail within exemplary embodiments herein.

It is noted that the shape, structure, and size of the aperture selector 600 and/or components thereof shown in FIGS. 6A-6C are illustrated as shown only for the sake of example, and are not necessarily to scale. Other configurations of the aperture selector 600 are possible as well. For example, alternatively or additionally to the rotatable structure 610, the selector 600 may comprise a collection of light filters (or windows), such as in a stack arrangement for instance, and the selector 600 may actuate a respective one of the light filters to be interposed between the LIDAR 504 and the camera 506 for capturing a corresponding image. As another example, the apertures 618a, 628b may have different shapes (e.g., circular, etc.) than the shapes shown. Other examples are possible as well.

Further, although the selector 600 is shown to include three windows 608, 618, 628, in some examples, the selector 600 may include fewer or more windows. For example, another window (not shown), may include an aperture that is substantially perpendicular to apertures 618a, 628a when the other window is interposed between the LIDAR 504 and the camera 506. Other examples as possible as well.

III. Example Methods and Computer Readable Media

Figure 7:
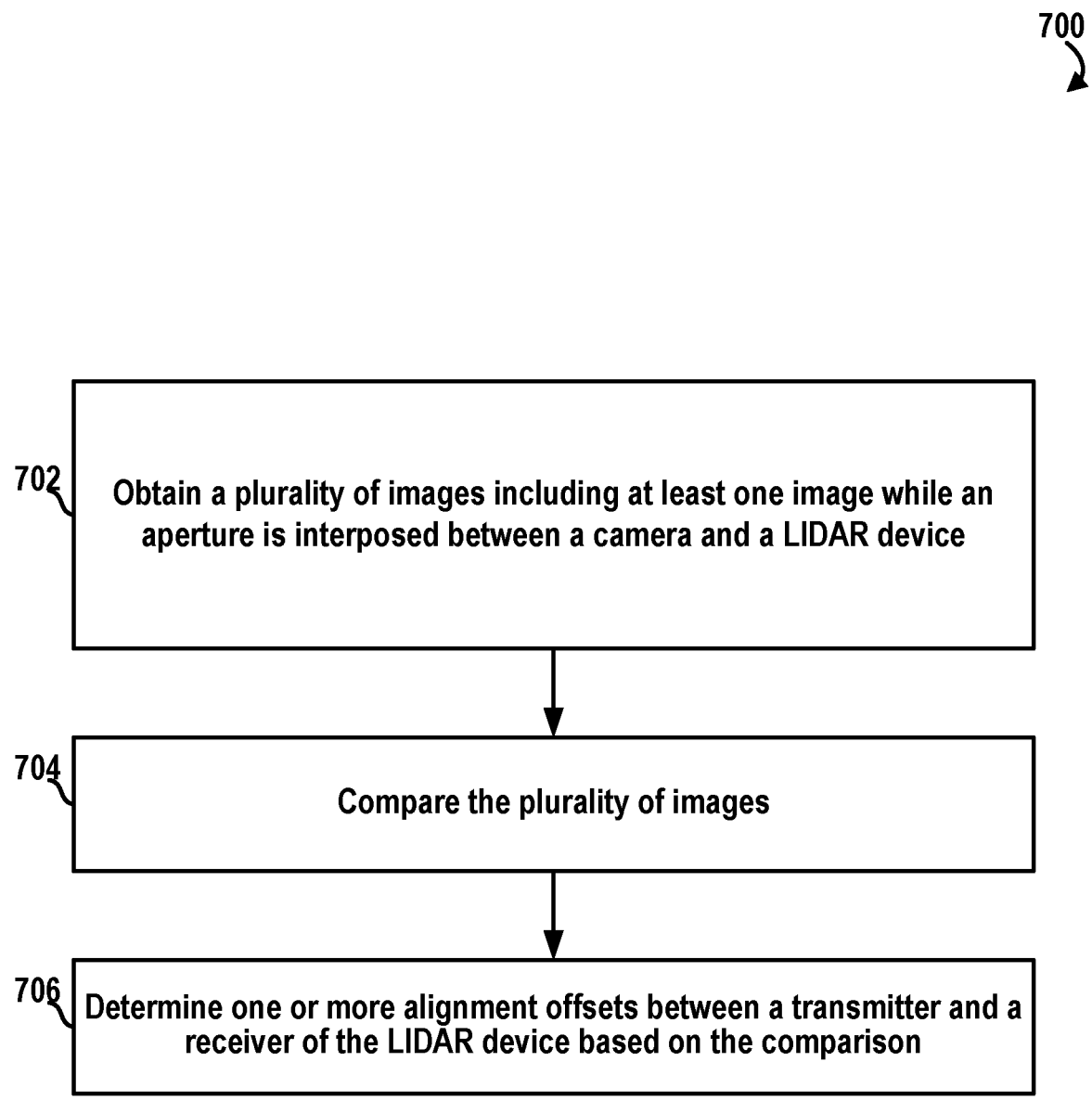
FIG. 7 is a flowchart of a method, according to an example embodiment.

FIG. 7 is a flowchart of a method 700, according to an example embodiment. Method 700 shown in FIG. 7 presents an embodiment of a method that could be used with any of the devices 100, 220, 330, the systems 400, 500 and/or the aperture selector 600, for example. Method 700 may include one or more operations, functions, or actions as illustrated by one or more of blocks 702-706. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 700 and other processes and methods disclosed herein, each block in FIG. 7 may represent circuitry that is wired to perform the specific logical functions in the process.

At block 702, the method 700 involves obtaining a plurality of images using a camera located at a given position relative to a LIDAR device. The plurality of images may include a first image obtained while a first aperture is interposed between the camera and the LIDAR device, and a second image obtained while a second aperture is interposed between the camera and the LIDAR device.

For example, the system 500 may obtain a plurality of images using the camera 506 located at the given position (shown in FIG. 5) relative to the LIDAR device 504. Further, the first image may correspond to an image captured while the first aperture 618a is interposed between the camera 506 and the LIDAR 504, and the second image may correspond to an image captured while the second aperture 628a is interposed between the camera 506 and the LIDAR 504, in line with the discussion above. However, in some embodiments, the second image may correspond to an image captured while none of the first or second apertures is interposed between the camera and the LIDAR. For example, the plurality of images may alternatively include only one image where an aperture is interposed between the camera and the LIDAR device, and one or more images captured without an aperture being interposed between the camera and the LIDAR device.

In some implementations, the method 700 may involve locating the camera at the given position at which the camera can image light beams emitted by the one or more light sources and can image the one or more detectors. By way of example, the given position may be similar to the position of the camera 506 of the system 500. For instance, a field-of-view of the camera may be aligned with a FOV of the LIDAR device where light emitted from the one or more light sources propagates away from the LIDAR device.

Further, in some examples, the LIDAR device may include a transmitter (e.g., transmitter 420) comprising one or more light sources (e.g., light sources 422), and a receiver (e.g., receiver 430) comprising one or more light detectors (e.g., detectors 432).

To that end, in some implementations, the method 700 may involve mounting a transmitter and a receiver in a light detection and ranging (LIDAR) device to provide a relative position between the transmitter and the receiver. Further, in some instances, the transmitter may include one or more light sources configured to emit light at a source wavelength, and the receiver may include one or more detectors configured to detect light at the source wavelength. In one embodiment, the source wavelength is 905 nm. In other embodiments, the source wavelength may be any other wavelength (e.g., infrared, ultraviolet, x-ray, visible, etc.).

In one example, the transmitter and the receiver may be mounted by a robotic arm (e.g., alignment apparatuses 460, 560, etc.) into a housing (e.g., housing 110, etc.) of the LIDAR device to provide the relative position. For instance, the relative position may relate to the mounting positions of transmitter 120 and receiver 130 of FIG. 1B. In another example, the mounting of the transmitter and receiver may be performed by a device other than the alignment apparatus 460 or 560. For instance, the mounting may correspond to an alignment (e.g., adjustment of the relative position) by a system performing the method 700 for a transmitter and a receiver that are already mounted in a LIDAR device.

In some examples, the LIDAR device may also include a lens configured to (i) direct or collimate light emitted from the one or more light sources and (ii) focus light propagating toward the LIDAR device onto the one or more detectors, similarly to the lens 150 for instance. In other examples, the LIDAR device may include a transmit lens for collimation/direction of emitted light and a receive lens for focusing received light.

In some examples, the first image obtained at block 702 (while the first aperture is interposed between the camera and the LIDAR device) may be indicative of first detector positions of the one or more light detectors in the receiver, and the second image may be indicative of second detector positions of the one or more light detectors in the receiver. Referring back to FIG. 1B by way of example, the first image (and/or the second image) may represent the detectors 132a-c that are viewable to the camera via the lens 150 and the mirror 142.

Further, in line with the discussion above, the first detector positions indicated by the first image may be offset (e.g., distorted) based on the first position of the first aperture. For example, where the first aperture corresponds to the aperture 618a of FIG. 6B, the first image may be distorted in a particular direction along a line that extends through the aperture 618a and the camera axis 640. Thus, for instance, the first detector positions in the first image may be distorted (e.g., shifted, etc.) along the direction of distortion caused by the first aperture.

Similarly, the second detector positions indicated by the second image may be offset (e.g., distorted) based on the second position of the second aperture. As shown in FIGS. 6B and 6C for instance, the apertures 618a and 628a (when interposed between the camera and the LIDAR) are symmetrically arranged relative to the axis 640. Thus, where the second aperture corresponds to the aperture 628a of FIG. 6C for example, the second image may be distorted in an opposite direction (compared to the first image) along the line that extends through aperture 628a and the camera axis 640.

In some implementations, the method 700 may involve obtaining the first image (and/or the second image) while the one or more light sources (of the LIDAR transmitter) are not emitting light at the source wavelength (of the light emitted by the LIDAR transmitter). For instance, system 400 may reduce power to the one or more light sources 422 and/or provide instructions to the LIDAR device 404 to stop emitting light beams 424 while the camera 406 is capturing the first image (and/or the second image).

However, in other implementations, the method 700 may involve obtaining the first image (and/or the second image) while the one or more light sources are emitting the light at the source wavelength. For instance, a light filter (e.g., light filters 618, 628) may be interposed between the camera and the LIDAR device while the camera is capturing the first image (and/or the second image), and the light filter may be configured to attenuate light at the source wavelength emitted by the one or more light sources. In this instance, the system performing the method 700 may then obtain the first image (and/or the second image) while the light filter attenuates the light beams (e.g., beams 424) emitted by the one or more light sources.

In some implementations, the method 700 may involve obtaining the first image (and/or the second image) while the one or more detectors are illuminated with light at the source wavelength from an auxiliary light source (e.g., auxiliary light source(s) 470). In one example, the camera may be focused at infinity for the source wavelength. In another example, a light filter interposed between the camera and the LIDAR device may be configured to attenuate light having wavelengths other than the source wavelength. In both examples, the auxiliary light source may illuminate the one or more detectors such that reflections of the illuminating light having the source wavelength are viewable by the camera when capturing the first image (and/or the second image). Accordingly, in some examples, the method 700 may involve causing (e.g., by controller 480) an auxiliary light source to illuminate the receiver (of the LIDAR device) with light having a source wavelength of light emitted by the transmitter (of the LIDAR device), and obtaining the first image (and/or the second image) while the receiver is illuminated by the auxiliary light source.

In some implementations, the method 700 may involve obtaining a third image indicative of light source positions of the one or more light sources in the LIDAR device. The third image, for example, may be obtained using the camera located at the given position (and optionally while the camera is focused at infinity). Referring back to FIG. 1B by way of example, the light source positions of the light sources 122a-c may vary according to the particular orientation and position of the transmitter 120. In turn, the direction of propagation of the light beams 104a-c may also vary, and such variation may be represented by pixels in the third image obtained by the camera.

In some implementations, the method 700 may involve obtaining the third image while the one or more light sources are emitting light at the source wavelength. For instance, the system 400 may provide power and/or instructions to the LIDAR device 404 to emit the light at the source wavelength, and may provide instructions to the camera 406 to capture the third image while the one or more light sources are emitting the light. Further, in some instances, the system may provide instructions to the camera to adjust its focus to infinity for the source wavelength. Alternatively, for instance, the camera may be configured to have the focus prior to capturing the third image.

In some implementations, the method 700 may involve obtaining the third image while a light filter is interposed between the camera and the one or more light sources of the LIDAR device. For instance, the light filter may be similar to the light filters 408, 508, 608, 618, 628, etc. In one example, the light filter may be configured to attenuate light having wavelengths other than the source wavelength of emitted light (e.g., beams 424) from light sources in the LIDAR device. In this example, the third image may be more suitable for representing features of the emitted light beams at the source wavelength relative to other sources of light (e.g., background light, etc.). In another example, the light filter may additionally or alternatively be configured to attenuate light within a wavelength range that includes the source wavelength. In this example, the light filter may reduce the intensity of the emitted light to protect components of the camera. Further, in this example, the light filter may reduce an amount of light propagating toward the camera that has wavelengths proximal to the source wavelength. In turn, for instance, pixels in the third image representing the emitted light beams having the source wavelength may be easily contrasted from surrounding pixels having proximal wavelengths.

In some implementations, the method 700 may involve causing an actuator to position at least one filter of a plurality of light filters. The plurality of filters could include, for example, a first light filter that has a first region corresponding to a first aperture and a second light filter that has a second region corresponding to a second aperture. In one approach, the system 400 may cause the actuator 412 to manipulate an aperture selector, such as selector 600 for instance, thereby causing one of the plurality of light filters to be interposed between the LIDAR device and the camera. For example, prior to obtaining the first image at block 702, the actuator 412 may rotate the rotatable structure 610 about the axis 630 until the first light filter 618 having the first aperture 618a is interposed between the camera and the LIDAR device (as shown in FIG. 6B). In this example, prior to obtaining the second image at block 702, the actuator 412 may rotate the rotatable structure 610 until the second light filter 628 having the second aperture 628a is interposed between the camera and the LIDAR device.

Accordingly, in some implementations, causing the actuator to position at least one light filter of the plurality of light filters involves, prior to obtaining the first image, causing the actuator to arrange the plurality of light filters according to a first configuration (e.g., configuration of FIG. 6B) associated with the first light filter (e.g., light filter 618) being interposed between the camera and the LIDAR device. In these implementations, causing the actuator to position at least one light filter of the plurality of light filters also involves, prior to obtaining the second image, causing the actuator to arrange the plurality of light filters according to a second configuration (e.g., configuration of FIG. 6C) associated with the second light filter being interposed between the camera and the LIDAR device.

At block 704, the method 700 involves comparing the plurality of images. For example, the first image may indicate first detector positions of the one or more light detectors in the LIDAR receiver, and the second image may indicate second detector positions of the one or more light detectors. Accordingly, in some implementations, the comparison at block 704 may involve comparing the first detector positions indicated by the first image to the second detector positions indicated by the second image.

Further, in some implementations, comparing the first detector positions to the second detector positions may involve comparing locations of one or more image pixels associated with a given light detector in the first image to locations of one or more corresponding image pixels associated with the given light detector in the second image. In the scenario of FIGS. 6B-6C for instance, where the first aperture 618a and the second aperture 628a are configured to be at opposite directions from the camera axis 640 (while respectively interposed between the camera and the LIDAR), the difference between a first detector position of a particular light detector and a second detector position of the particular light detector may indicate a depth offset (e.g., how far the particular detector is from the camera), a translational offset (e.g., along an axis that extends between the two apertures 618a, 628a), or a rotational offset (e.g., roll, pitch, yaw, etc.).

Further, in some examples, the third image (e.g., obtained while window 608 is interposed between the camera and the LIDAR in the scenario of FIG. 6A) indicates light source positions of the one or more light sources in the LIDAR transmitter. Accordingly, in some implementations, the comparison at block 704 may also involve comparing the first detector positions indicated by the second image, the second detector positions indicated by the second image, and the light source positions indicated in the third image. In the scenario of FIGS. 6A-6C for instance, an extent of overlap between the first detector position (of a particular light detector), the second detector position (of the particular light detector), and a light source position (of a corresponding light source) may indicate a depth offset (e.g., along axis 640) of the particular light detector relative to the corresponding light source.

In some examples, the one or more light detectors of the receiver in the LIDAR device may comprise one or more avalanche photodiodes (APDs). The APDs may have a characteristic of emitting light when connected to power according to a first voltage bias configuration (e.g., first direction of current flowing through the APDs) and detecting light when connected to the power according to a second voltage bias configuration (e.g., opposite direction of current flowing through the APDs). Thus, in some implementations, the method 700 may involve, while obtaining the first image (and/or the second image), causing the one or more APDs to operate according to a given voltage bias configuration that causes the one or more APDs to emit light. By doing so, for instance, pixels in the first image (and/or second image) associated with detector positions may be more accurately contrasted against surrounding pixels. As a result, for instance, detector positions in the first image (and/or the second image) can be estimated more accurately by an example system (e.g., the system 400, etc.) that compares the plurality of images at block 704.

At block 706, the method 700 involves determining one or more alignment offsets between the transmitter and the receiver of the LIDAR device based on the comparison. In line with the discussion above, for example, a system of the method 700 may determine the one or more alignment offsets at block 706 based on a comparison of pixel locations (indicated in the first, second, and/or third images) associated with a particular light detector and a corresponding light source.

In some implementations, the method 700 may involve determining at least one distance offset based on the light source positions (indicated by the third image) and the detector positions (indicated by the first image and/or the second image).

In a first example, the at least one distance offset may include distances between adjacent regions of the third image that are associated with particular light sources. In a second example, the at least one offset may include a distance between a first (e.g., distorted) detector position of a particular detector indicated by the first image and a second detector position of the particular detector indicated by the second image. In a third example, the at least one offset may include distances between adjacent regions of the first image (or second image) that are associated with particular detectors. In fourth example, the at least one offset may include an offset between a region of the third image associated with a given light source, and a region of the first image (and/or second image) associated with a corresponding detector.

In these examples, the offset may have a horizontal component and a vertical component, or may just be a distance between the respective regions (e.g., number of pixels).

In some implementations, the method 700 may involve generating a composite image based on overlaying the first image, the second image, and/or the third image. In these examples, the at least one offset may be determined based on separation between one or more pixels in the composite image associated with a light source and one or more pixels in the composite image associated with a corresponding detector. For example, the composite image may include an indication of a light source position (based on pixel(s) in the third image) together with an indication of a first detector position (based on pixel(s) in the first image) and an indication of a second detector position (based on pixel(s) in the second image).

In some implementations, the method 700 may involve providing an indication of the one or more alignment offsets via a display. For example, the system 400 may operate the display 464 to display the composite image or a portion thereof (e.g., displaying an image of a light source overlaid with two circles showing detector positions of a corresponding detector indicated by the respective two images obtained via the two apertures). As another example, the system 400 may display a graphical illustration of the one or more alignment offsets (e.g., a scatter plot or curve indicating a relationship between one or more alignment offsets and a position of a detector in the image(s)). Other examples are possible as well.

In some implementations, the method 700 may involve adjusting a mounting position of the transmitter and/or the receiver in the LIDAR device based on the one or more determined alignment offsets. In one example embodiment, the controller 480 of the system 400 may provide a signal to alignment apparatus 460 that causes the alignment apparatus 460 to adjust the mounting position of the transmitter 420 and/or the receiver 430 in the LIDAR device 404. Accordingly, in some implementations, the method 700 may involve causing (e.g., by the controller 480) an adjustment of a mounting position of at least one of the transmitter or the receiver (of the LIDAR device).

By way of example, a robotic arm or other device (e.g., alignment apparatuses 460, 560, etc.) may couple to the transmitter and/or the receiver to adjust the relative position. The robotic arm, for instance, may translate the coupled component linearly and/or rotate the coupled component about an axis. Accordingly, in some implementations, the method 700 may involve adjusting the relative position between the transmitter and the receiver by rotating the receiver about an axis. Additionally or alternatively, in some implementations, the method 700 may involve adjusting the relative position by rotating the transmitter about an axis.

Adjusting the mounting position of the transmitter and/or the receiver may beneficially reduce the one or more alignment offsets. For instance, where the one or more alignment offsets include an offset between a light source and a corresponding detector, the adjustment of the relative position between the transmitter and the receiver may reduce the offset to align the light source with the detector. In other examples, adjusting the relative position between the transmitter and the receiver causes at least one of the one or more alignment offsets to correspond to a particular offset. For instance, where the one or more alignment offsets includes an offset between two adjacent light sources, the adjustment of the relative position may cause the offset to correspond to the particular offset.

Figure 8:
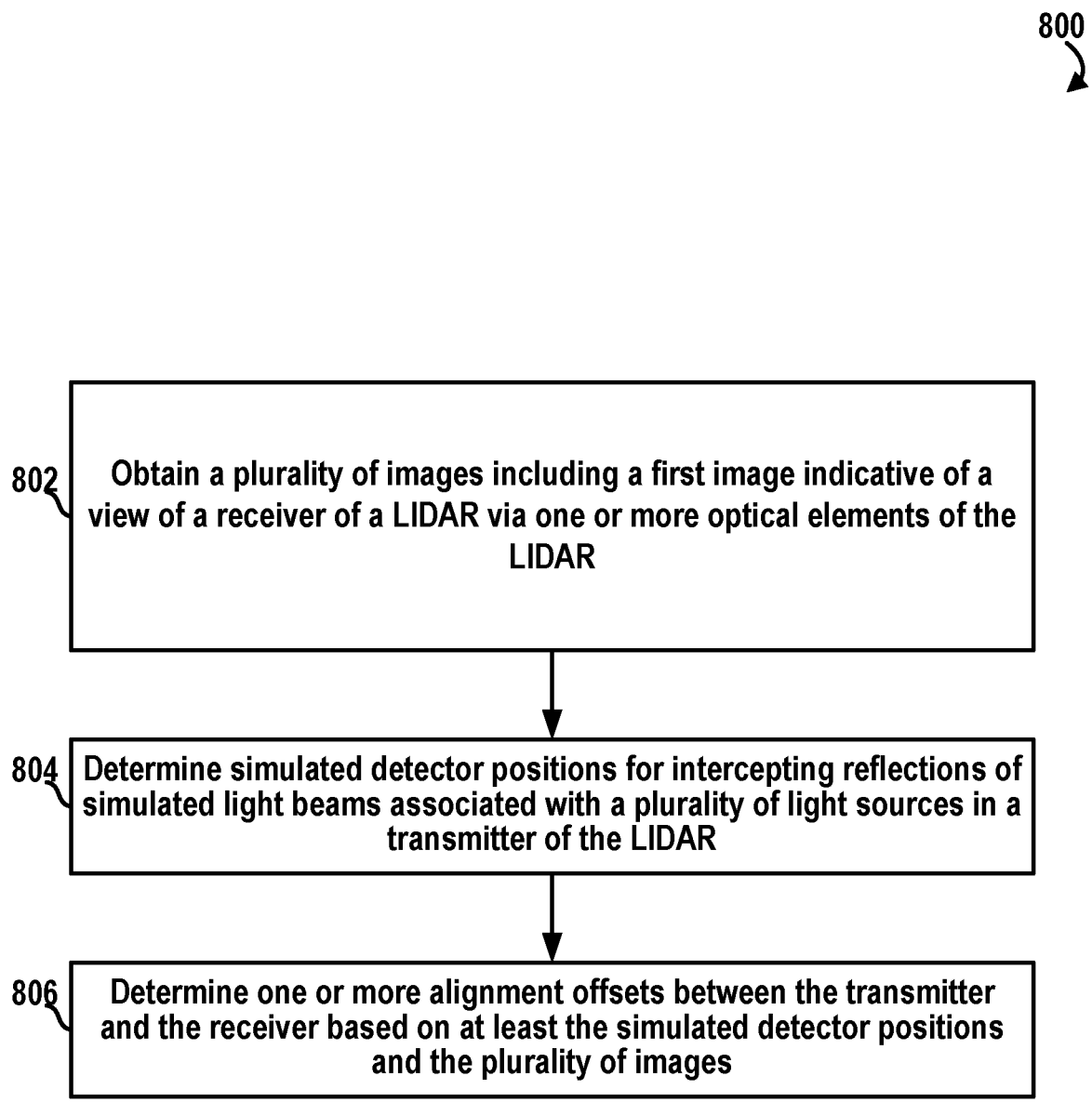
FIG. 8 is a flowchart of another method, according to an example embodiment.

FIG. 8 is a flowchart of a method 800, according to an example embodiment. Method 800 shown in FIG. 8 presents an embodiment of a method that could be used with any of the devices 100, 220, 330, the systems 400, 500 and/or the aperture selector 600, for example. Method 800 may include one or more operations, functions, or actions as illustrated by one or more of blocks 802-806. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 802, method 800 involves obtaining a plurality of images including a first image indicative of a view of a receiver of a light detection and ranging device (LIDAR) via one or more optical elements of the LIDAR.

Referring back to FIG. 5 for example, camera 506 may capture the plurality of images from the given position (where camera 506 is mounted—within the field of view of LIDAR 504). Thus, referring back to FIG. 1B for example, the first image may indicate a view of the light detectors 132a-132c in the receiver 130 as viewed by the camera via lens 150, mirror 142, and light filter 134 (i.e., via the "one or more optical elements" of LIDAR 100).

In some examples, the LIDAR may comprise a transmitter, the receiver, and one or more optical elements. The transmitter may be similar to any of transmitters 120, 220, 420 for example, and may include a plurality of light sources similar to any of light sources 122a-122c, 222a-222c, 422 for example. The receiver may be similar to any of receivers 130, 330, 430 for example, and may include a plurality of light detectors similar to any of light detectors 132a-132c, 332a-332c, 432 for example. The one or more optical elements may be similar to any combination of lens 150, mirrors 124, 142, light filter 134, lens 350, and/or optical element(s) 450, for example.

In some embodiments, similarly to the description at block 702 of method 700, obtaining the plurality of images at block 802 comprises: capturing the first image while a first aperture is located at a first position between the camera and the LIDAR; and capturing a second image while a second aperture is located at a second position between the camera and the LIDAR. Thus, in these embodiments, the view of the receiver indicated by the first image may also be via the first aperture (618a). Similarly, the second image may be indicative of a view of the receiver via the second aperture (628a) and the one or more optical elements of the LIDAR.

In line with the discussion at blocks 702 and 704 of method 700 for instance, the measured detector positions indicated by the first image may exhibit different distortions than corresponding measured detector positions indicated by the second image (due to the different positions of the first aperture and the second aperture). Further, the difference between the distortions can facilitate determining alignment offsets between the transmitter and the receiver.

Additionally, referring back to FIG. 1B for instance, in LIDAR implementations where the light sources and/or the detectors are arranged along curved focal surfaces (128, 138), the extent of the respective distortions may correlate with the actual light source/detector positions along the curved focal surfaces (128, 138). Thus, the difference between the distortions associated with the first and second images can be used to further determine misalignments between the transmitter and the receiver in such LIDAR implementations.

Additionally, in some instances, the difference between the distorted measured positions may also relate to optical characteristics of the one or more optical elements (e.g., lens 150). Continuing with the example of FIG. 1B for instance, a first portion of reflected light 106 received at a right side of lens 150 (from a distant object) might be focused by lens 150 at a different offset location than a second portion of the reflected light that is received at a left side of lens 150 due to optical characteristics of lens 150. Thus, in these instances, capturing multiple images via apertures at different positions may allow a system of method 800 to determine optimal detector positions for increasing the amount of focused light 108 that is intercepted by the detectors 132a-132c (from both sides of the lens 150). Other advantages of using apertures to improve calibration accuracy are possible as well.

In some embodiments, obtaining the plurality of images at block 802 involves capturing the first image (and/or the second image) while the plurality of light sources is not emitting light beams, in line with the discussion at block 702 of method 700.

In some embodiments, obtaining the plurality of images comprises capturing a third image while the plurality of light sources is emitting light beams. For example, the third image may be indicative of a view, via the one or more optical elements, of the plurality of light sources in the transmitter. Referring back to FIG. 1B for example, the third image may be indicative of a view of the light beams 104a, 104b, 104c, which were emitted by the light sources 122a, 122b, 122c as light beams 102a, 102b, 102c, then reflected by mirror 124 through aperture 126 toward lens 150, and then collimated by lens 150 as the light beams 104a, 104b, 104c. Thus, in some embodiments, the third image may be indicative of measured positions of the emitted light beams (e.g., relative to one another) from the viewpoint of the camera.

It is noted that the camera may capture the plurality of images described at bock 802 in any chronological order. For example, although the image of the emitted light beams is referred to above as the "third" image, the method 800 may involve capturing the third image before capturing the first image and/or the second image. Thus, the first image, the second image, and/or the third image can be captured by the camera according to any chronological order depending on various applications of the method 800.

In some embodiments, method 800 involves causing one or more auxiliary light sources to illuminate the receiver with light having a source wavelength of light emitted by the transmitter, in line with the discussion at block 702 of method 700 and/or the description of the auxiliary light source(s) 470 of system 400. Thus, in some embodiments, obtaining the plurality of images at block 802 may involve: capturing the first image while the receiver is being illuminated by the one or more auxiliary light sources; and capturing the third image (of the emitted light beams) while the receiver is not being illuminated by the auxiliary light source(s).

At block 804, method 800 involves determining simulated detector positions for intercepting reflections of simulated light beams associated with the plurality of light sources in the transmitter of the LIDAR.

In a first implementation, a computing device (e.g., controller 480) can be configured to perform a simulation of an expected physical arrangement of one or more components of the LIDAR (e.g., the plurality of light sources in the transmitter, the one or more optical elements, etc.). Referring back to FIG. 1B for example, the computing device may determine simulated positions of light beams 104a, 104b, 104c, etc., relative to one another based on optical characteristics and physical locations of light sources 122a, 122b, 122c, mirror 124, aperture 126, and lens 150. In this example, the computing device may also simulate reflection of the simulated light beams (e.g., as reflected light 106) off a simulated object in the environment of LIDAR 100, and propagation of the reflected light 106 via lens 150 (e.g., as light 108) and via mirror 142 (as reflected light beams 108a, 108b, 108c) in accordance with given optical characteristics of lens 150 and mirror 142. The computing device can then determine the simulated detector positions for intercepting the simulated reflections (e.g., beams 108a, 108b, 108c, etc.) of the simulated light beams.

Thus, in some embodiments, method 800 may involve determining the simulated detector positions at block 804 based on at least a simulation of the one or more optical elements and the plurality of light sources of the LIDAR.

Further, in some embodiments, method 800 may involve simulating reflection of the simulated light beams off a simulated object located at a particular distance to the LIDAR. The particular distance may be any distance (e.g., 100 meters, 50 meters, etc.), such as a distance at which the LIDAR is expected to provide relatively accurate scanning data.

In some embodiments, determining the simulated detector positions at block 804 may be further based on a scanning range configuration of the LIDAR. The scanning range configuration may depend on various factors such as the light intensity, refresh rate, or any other LIDAR configuration parameter for instance. For example, if the LIDAR is configured to scan objects within a particular range of distances (e.g., between 1 meter and 100 meters) and according to a threshold error tolerance, then a system of method 800 may simulate (or obtain simulated data related to) reflection of the simulated light beams off a simulated object that is at or near one or more distances (e.g., 50 meters, 100 meters, etc.) to the LIDAR (within the particular range of distances). By doing so, for instance, the system may determine simulated detector positions according to the scanning range configuration of the LIDAR for achieving a desired alignment (i.e., within the threshold error tolerance) for all or most of the light sources and the light detectors, at least with respect to scanning for objects within the particular range of distances.

In a second implementation, the simulation described above can be alternatively performed by an external computing device; and the computing device of method 800 (e.g., controller 480) can obtain simulation data (generated by the external computing device) from data storage accessible to the computing device (e.g., data storage 484, etc.).

Thus, in some embodiments, method 800 may involve simulating (or obtaining data related to a simulation of) a physical arrangement of the one or more optical elements and the plurality of light sources. Further, in some embodiments, method 800 may involve simulating (or obtaining data related to a simulation of) optical characteristics of the one or more optical elements.

In a third implementation, the computing device (e.g., controller 480) of method 800 may obtain the simulation data in a different manner. For example, the computing device may compute the simulated detector positions without simulating the reflection of simulated light beams off a simulated object.

In a fourth implementation, the data storage (e.g., 484) accessible to the computing device may include several sets of simulation data associated with different LIDAR configurations and/or simulated object distances (e.g., 100 meters, 50 meters, etc.); and the computing device may select one or more of the stored sets of simulated data for calibrating the LIDAR. The selection may be based on user input (e.g., received via a GUI of display 464, etc.) and/or any desired calibration rules for the LIDAR. Thus, for instance, an example system can simulate various types of LIDAR device configurations (e.g., separate transmit/receive lens, various transmitter or receiver arrangements, various numbers of light sources and/or light detectors, various optical element arrangements, etc.) in addition to or instead of the LIDAR configurations illustrated for LIDARs 100, 404, and 504.

Accordingly, in some embodiments, method 800 involves selecting simulation data for the LIDAR from one or more sets of stored simulation data, and determining the simulated detector positions at block 804 based on the selected simulation data.

As noted above, in some embodiments, obtaining the plurality of images at block 802 involves capturing the first image of the receiver via the first aperture (618a) and capturing the second image of the receiver via the second aperture (628a). In some embodiments, determining the simulated detector positions at block 804 may also involve determining a first set of simulated detector positions based on a simulation of the first aperture being located at the first position; and determining a second set of simulated detector positions based on a simulation of the second aperture being located at the second position. By way of example, a system of method 800 may simulate (or obtain simulation data related to): the first set of (distorted) simulated detector positions, and the second set of (distorted) simulated detector positions.

At block 806, method 800 involves determining one or more alignment offsets between the transmitter and the receiver based on at least the simulated detector positions and/or the plurality of images.

In some embodiments, method 800 may involve adjusting a mounting position of the transmitter and/or a mounting position of the receiver based on the one or more determined alignment offsets. To that end, in some scenarios, the determination of the alignment offset(s) at block 806 to achieve an optimal alignment for all the light sources in the transmitter with all the corresponding light detectors in the receiver may be challenging.

In a first scenario, referring back to FIG. 2 for instance, light sources 222a, 222b, 222c, etc., are mounted in transmitter 220 in a physical arrangement relative to one another. Similarly, as shown in FIG. 3, light detectors 332a, 332b, 332c, etc. are also mounted in receiver 330 in a corresponding physical arrangement relative to one another. Thus, in this scenario, adjusting the mounting position of the transmitter (or receiver) may adjust the positions of multiple light sources (or light detectors) simultaneously. Thus, in some implementations, the determination of the alignment offsets at block 806 may involve accounting for various types of interdependent misalignments concurrently (e.g., rotation misalignments, translation misalignments in the x-direction, y-direction, and z-direction, etc.) to optimize the alignment of all or most of the light sources with their corresponding light detectors.

In a second scenario, the view(s) of the receiver indicated by the first image (and/or the second image) described at block 802 may not include all the light detectors in the receiver for various reasons. Referring back to FIGS. 6A-6C instance, one or more of the light detectors in the receiver may not be viewable to the camera via the apertures 618a and/or 628a due to the position of the respective aperture relative to the LIDAR. Thus, in this scenario, determining a rotation axis (e.g., center of rotation) for a rotation alignment offset may be challenging due to the lack of image data for determining light detector positions of the one or more light detectors. Thus, in some implementations, the determination of the alignment offsets at block 806 may involve determining a rotation alignment offset and estimating a center of rotation for the determined alignment offset. For instance, a system of method 800 may be configured to determine such rotation alignment offset (and its associated rotation axis) based on the (e.g., predetermined) physical arrangement of the light detectors in the receiver.

In some examples, a system of method 800 may compare the simulated detector positions with measured detector positions (e.g., image pixel locations, etc.) of the light detectors indicated by the first image of block 802. Based on the comparison, for instance, the system may determine translational alignment offsets (e.g., along an x-axis or y-axis of the image, etc.), rotational alignment offsets (e.g., roll, pitch, yaw rotation), and/or depth offsets (e.g., along a z-axis extending out of the image). In a first example, if particular measured detector positions of one or more particular light detectors (indicated in the first image) appear to be shifted by a certain distance in a same direction relative to corresponding simulated detector positions of the particular light detector(s), then the system can determine translational alignment offset(s) between the simulated detector positions and the measured detector positions. In a second example, if the particular measured detector positions appear to be rotated or skewed (e.g., distance between adjacent detectors increases near one end of the first image and decreases near the other end of the first image), then the system may determine rotational alignment offset(s) about a roll, pitch, or yaw axis. In a third example, if the particular measured detector positions appear to be further apart from or closer to one another, then one or more depth alignment offsets (along the z-axis) can be determined by the system.

Thus, in some embodiments, method 800 involves determining measured detector positions of the plurality of light detectors based on the first image of block 802. In these embodiments, determining the one or more alignment offsets at block 806 may be further based on the determined measured detector positions. Further, in some embodiments, determining the one or more alignment offsets at block 806 may involve comparing the measured detector positions with the simulated detector positions of block 804.

As noted above, in some embodiments, obtaining the plurality of images at block 802 involves capturing the first image of the receiver via the first aperture (618a) and capturing the second image of the receiver via the second aperture (628a). Thus, for example, the first image may be indicative of first measured detector positions of the plurality of light detectors (e.g., distorted according to the first position of the first aperture); and the second image may be indicative of second measured detector positions of the plurality of light detectors (e.g., distorted according to the second position of the second aperture).

In these embodiments, determining the one or more alignment offsets at block 806 may involve comparing the first measured detector positions, the second measured detector positions, and the simulated detector positions.

In one embodiment, method 800 may involve determining the one or more alignment offsets at block 806 to maximize an overlap between the simulated detector positions, the first measured detector positions, and the second measured detector positions. For instance, a system of method 800 can select an alignment offset such that a particular simulated detector position overlaps a portion of a particular light beam focused through the first aperture and a portion of the particular light beam focused through the second aperture.

In another embodiment, as noted above at block 804, determining the simulated detector positions may involve determining a first set of simulated detector positions based on a simulation of the first aperture, and a second set of simulated detector positions based on a simulation of the second aperture. In this embodiment, determining the one or more alignment offsets at block 806 may involve comparing the first measured detector positions to the first set of simulated detector positions and comparing the second measured detector positions to the second set of simulated detector positions.

In some examples, the various types of alignment offsets (e.g., translational, rotational, depth, etc.) described above can be computed or approximated using a mathematical transformation model, such as any linear or non-linear transformation algorithm, linear transformation matrix coefficients, linear regression, linear best fit algorithm, or any other linear or non-linear relationship computation for mapping measured positions (of the light sources and/or the light detectors) with their corresponding simulated positions.

By way of example, based at least in part on a physical arrangement of the light sources in the transmitter (e.g., FIG. 2) and/or a physical arrangement of the light detectors in the receiver (e.g., FIG. 3), translational, rotational, and/or depth alignment offsets can be approximated by determining a linear (or non-linear) model of the relationship between the simulated arrangement of detectors and the measured arrangement indicated by the first image. To facilitate this for instance, a system of method 800 may compute a mapping (e.g., a first transformation) between a two-dimensional (2D) space representation (e.g., distance units such as meters, inches, centimeters, etc.) of the simulated detector positions (or simulated light beam positions) and a 2D space representation (e.g., image pixel locations) of the measured detector positions (or measured light beam positions) indicated in the plurality of images. The system may then compute, based on the mapping, a second transformation (e.g., linear matrix coefficients, linear regression model, etc.) that associates corresponding measured and simulated light detector positions. The system could then use the determined transformation to adjust a mounting position of the transmitter or receiver (e.g., via alignment apparatus 460, 560, etc.) and thus reduce the determined alignment offset(s).

As noted above in the description of block 802 for instance, the plurality of images obtained using the camera may include an image indicative of the measured positions of the light beams emitted by the plurality of light sources.

Thus, in some embodiments, method 800 may also involve determining a mapping (e.g., first transformation) between the measured positions of the emitted light beams and simulated positions of the simulated light beams. For example, a system of method 800 may compute the first (linear or non-linear) transformation that maps a reference space (e.g., distance units such as inches, etc.) of the simulated positions to a reference space (e.g., pixel locations) of measured positions indicated by the third image. In some instances, the first transformation may also indicate mounting misalignments (e.g., rotations, translations, etc.) between the simulated light source positions and the measured light source positions.

Accordingly, in some examples, the first transformation can be used to determine alignment offset(s) for adjusting the mounting position of the transmitter. For example, if the measured light source positions appear skewed (e.g., distance between adjacent light beams increases depending on position of light beams relative to a side of the image), then a yaw and/or pitch rotation offset can be determined by a system of method 800. Further, for instance, the yaw rotation offset can then be used by the system to rotate the transmitter in an opposite yaw direction to reduce the offset.

In other examples however, the first transformation is instead used to define the mapping between the simulated space and the measured space. In these examples, the yaw offset may be accounted for by similarly offsetting the mounting position of the receiver instead of changing the mounting position of the transmitter.

In some embodiments, method 800 may involve comparing the measured detector positions with the simulated detector positions based on the mapping (e.g., first transformation). For example, the mapping can be applied to the measured detector positions to transform the measured detector positions from the image pixel unit space to the distance unit space (e.g., inches, etc.) or vice versa. Additionally, the mapping may account for offsets between the simulation space and the measured space, such as translation offsets and rotation offsets between the simulated light source positions and the measured light source positions. For example, if the mapping indicates that the simulated light source positions are offset by 10 centimeters in the x-direction relative to the measured light source positions, then the measured detector positions may be offset by 10 centimeters in accordance with the mapping.

In these embodiments, method 800 may involve determining the one or more alignment offsets at block 806 based on the comparison. For example, a second transformation can be computed between the (mapped) measured detector positions and the simulated detector positions. The second transformation, for example, may indicate translational alignment offsets (offsets in the x-direction, y-direction, etc.), scale offsets (e.g., offsets in the z-direction, etc.), and/or rotation offsets (e.g., roll offsets, pitch offsets, yaw offsets). For example, a system of method 800 can compute the second transformation using a linear regression, linear best fit model, matrix coefficients, etc., to align the measured detector positions with the simulated detector positions according the common frame of reference associated with the mapping. Through this process for instance, a computing device (e.g., controller 480) can use the second transformation values (e.g., coefficients, etc.) to compute the alignment offset(s) and operate an alignment apparatus (e.g., apparatus 460) that adjusts a mounting position of the receiver or the transmitter to reduce the alignment offsets.

Other mapping implementations are possible as well. For example, instead of determining the first and second transformations as linear transformations, a system of method 800 may compute nonlinear and/or any other type of mapping between any combination of the simulated light source positions, simulated light detector positions, measured light source positions, and/or measured light detector positions.

In some examples, a system of method 800 may repeat the process described above for blocks 802-806 to further reduce any misalignments due to a non-linearity that is not accurately represented by the linear transformation model(s), alignment errors introduced by the alignment apparatus, measurement errors due to image quality, and/or other misalignments that are not sufficiently reduced in a previous iteration of the adjustment to the mounting position of the transmitter or the receiver. Referring back to 5 for example, a different alignment error (e.g., "noise") may be introduced when the shaft coupler 562 is mechanically coupled to the transmitter or receiver of LIDAR 504 to adjust its mounting position. Thus, in some instances, the process of method 800 can be repeated iteratively until the alignment offset(s) are less than particular threshold value(s).

It is noted that the determination of the one or more alignment offsets at block 806 can be based on different types of simulation data in addition to or instead of the simulated detector positions. For example, the one or more alignment offsets can be determined based on simulated light source positions of the light sources. Other examples are possible.

Figure 9:
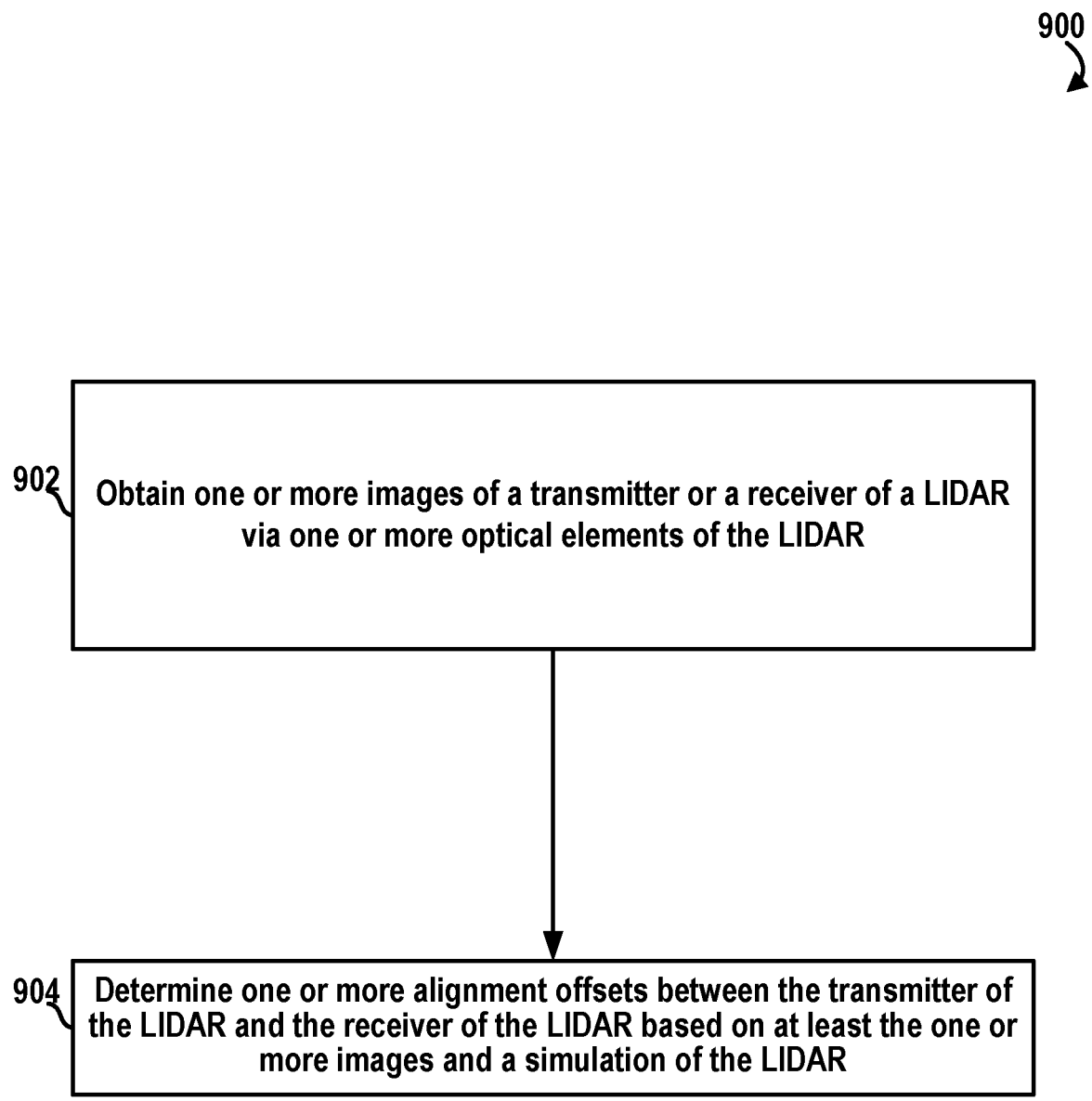
FIG. 9 is a flowchart of yet another method, according to an example embodiment.

FIG. 9 is a flowchart of a method 900, according to an example embodiment. Method 900 shown in FIG. 9 presents an embodiment of a method that could be used with any of the devices 100, 220, 330, the systems 400, 500 and/or the aperture selector 600, for example. Method 900 may include one or more operations, functions, or actions as illustrated by one or more of blocks 902-904. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 902, method 900 involves obtaining one or more images of a transmitter or a receiver of a LIDAR via one or more optical elements of the LIDAR. For example, obtaining the one or more images at block 902 may be similar to obtaining the plurality of images at block 802 of method 800. For instance, obtaining the one or more images may involve a camera (e.g., camera 406 or 506) capturing: a first image indicative of a view of the receiver via a first aperture, a second image indicative of a view of the receiver via a second aperture, and/or a third image indicative of a view of light beams emitted by the transmitter.

At block 904, method 900 involves determining one or more alignment offsets between the transmitter and the receiver based on at least the one or more images and a simulation of the LIDAR. In one example, the one or more alignment offsets may be similar to the one or more alignment offsets described at block 806 of method 800. In other examples, determining the one or more offsets at block 904 may be based on a variety of simulation parameters.

In one embodiment, method 900 may involve determining measured detector positions based on the first image, and determining simulated light source positions for emitting simulated light beams according to the measured detector positions. For example, a system of method 900 may simulate (or obtain simulation data related to) expected locations of the plurality of light sources for emitting light beams that are expected to be reflected back to the LIDAR and then focused (and/or otherwise directed) by the one or more optical elements of the LIDAR toward the measured detector positions. Thus, in some embodiments, method 900 may involve adjusting a mounting position of the transmitter based on a simulation of emitted light beams according to a measurement of the detector positions.

In other embodiments, method 900 may involve determining simulated light source positions, measured light source positions, simulated detector positions, and/or measured detector positions. Thus, the determination of the one or more alignment offsets at block 904 may be based on various combinations of simulation(s) and/or measurement(s).

Figure 10:
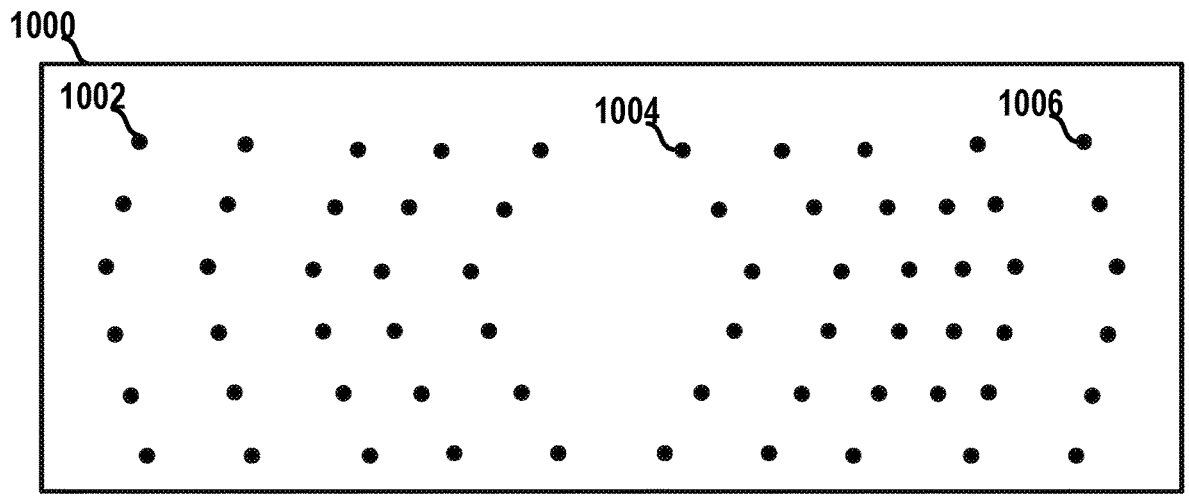
FIG. 10 illustrates an image indicative of light source positions, according to an example embodiment.

FIG. 10 illustrates an image 1000 indicative of light source positions of light sources in a transmitter of a LIDAR device, according to an example embodiment. For example, the image 1000 may be similar to the third image described at blocks 702 and block 802 of, respectively, methods 700 and 800. Referring back to FIG. 2 for example, regions 1002, 1004, 1006 shown in image 1000 may correspond, respectively, to image pixel locations of light beams 202a, 202b, 202c emitted by light sources 222a, 222b, 222c of the transmitter 220 (or any other light sources of a different LIDAR transmitter configuration).

Figure 11:
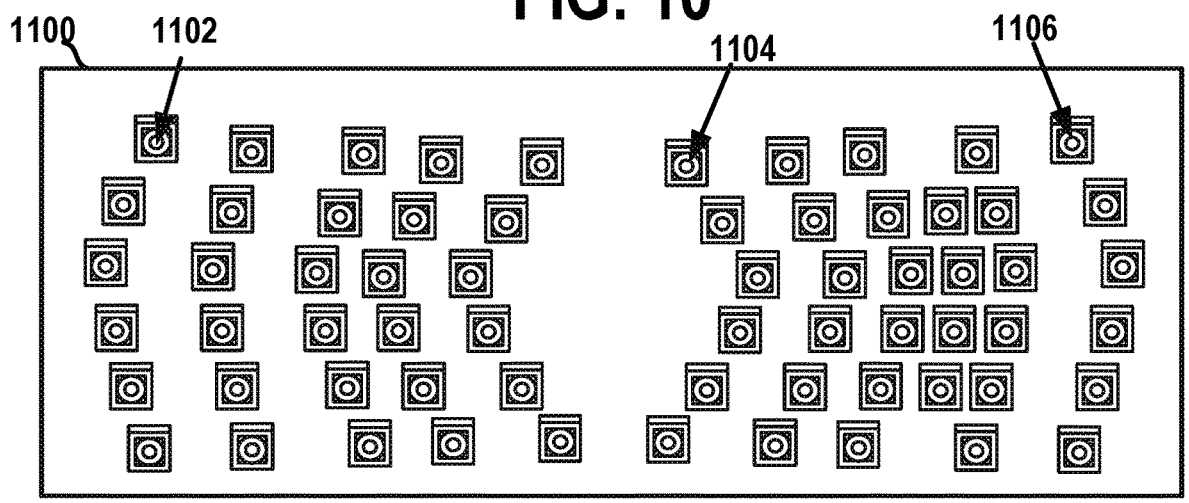
FIG. 11 illustrates an image indicative of distorted detector positions associated with a first aperture, according to an example embodiment.

FIG. 11 illustrates an image 1100 indicative of (distorted) measured detector positions of light detectors in a receiver of a LIDAR, according to an example embodiment. For instance, image 1100 may be similar to the first image (e.g., obtained while the first aperture 618a is interposed between the camera and the LIDAR) described at blocks 702 and 802 of, respectively, methods 700 and 800. Referring back to FIG. 3A for example, regions 1102, 1104, 1106 of the image 1100 may correspond, respectively, to the detectors 332a, 332b, and 332c of the receiver 330 (or any other detectors of a different LIDAR receiver configuration).

Figure 12:
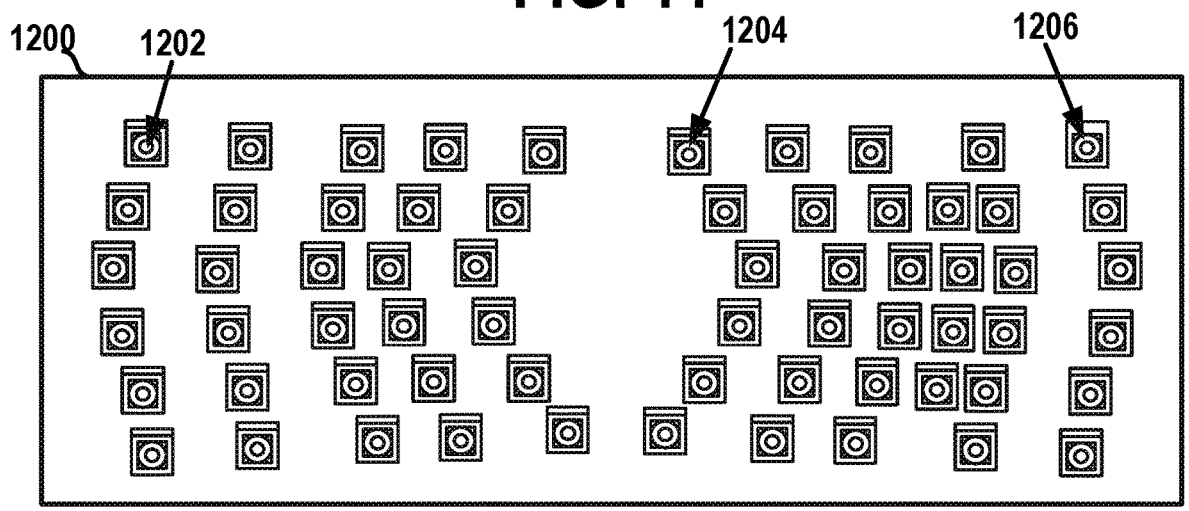
FIG. 12 illustrates an image indicative of distorted detector positions associated with a second aperture, according to an example embodiment.

FIG. 12 illustrates another image 1200 indicative of (distorted) measured detector positions of light detectors in a receiver of a LIDAR device, according to an example embodiment. For instance, image 1200 may be similar to the second image (e.g., obtained while the second aperture 628a is interposed between the camera and the LIDAR) described at blocks 702 and 802 of, respectively, methods 700 and 800. Referring back to FIG. 3A for example, regions 1202, 1204, 1206 of image 1200 may correspond, respectively, to detectors 332a, 332b, and 332c of receiver 330 (or any other detectors of a different LIDAR receiver configuration). It is noted that some of the components of a LIDAR receiver (e.g., wiring, PCB surface, etc.) may be omitted from the illustrations of images 1100 and 1200 for convenience in description.

In line with the discussion above, pixel locations (and/or sizes, shapes, etc.) of one or more detectors indicated in image 1100 differ from pixel locations of the same one or more detectors indicated in the image 1200. For example, as shown, pixel positions of the light detectors indicated by regions 1102, 1104, 1106 of image 1100 are different from pixel positions of the same light detectors indicated by regions 1202, 1204, 1206 of image 1200. As noted above, this difference may be based at least in part on the distance between the respective detectors and the camera as well as the locations of the respective apertures (e.g., 618a, 628a) through which the images 1100, 1200 are captured.

It is noted that the numbers, positions, sizes, and appearances of the light beams and/or light detectors indicated in images 1100 and 122 are only for the sake of example. In other examples, the numbers, positions, sizes, and appearances thereof may differ from the representations shown depending on the particular configuration of the imaged LIDAR.

In line with the discussion above, system 400 may be configured to determine (or obtain simulation data related to) positions of simulated light beams from the LIDAR, similar to the dark regions 1002, 1004, 1006, etc., of image 1000, based on a simulation of the LIDAR (e.g., optical elements, physical arrangement of light sources, etc.). To that end, the dark regions in image 1000 (e.g., 1002, 1004, 1006) may represent pixel locations of emitted light beams intercepted by the camera at the given position of the camera. Further, a similar representation of simulated light beams can be generated by system 400, in which these dots represent expected locations (e.g., in distance units) of the simulated light beams relative to one another.

Thus, in line with the discussion above, an example system of method 800 may determine a mapping between the image pixel locations of regions 1002, 1004, 1006, etc., and the simulated positions of the corresponding simulated light beams.

Further, system 400 may generate a representation of simulated detector positions similar to the representations in images 1100 and/or 1200 based on one or more simulations of the LIDAR. For example, a first simulation may involve a simulation of the first aperture being interposed between the camera and the LIDAR similarly to the scenario associated with image 1100; and a second simulation may involve a simulation of the second aperture being interposed between the camera and the LIDAR similarly to the scenario associated with image 1200.

Thus, in line with the discussion above, an example system of method 800 may apply the mapping of image 1000 to the image pixel locations (e.g., 1102, 1104, 1106, etc.) of image 1100, compare the (mapped) detector positions associated with image 1100 to the corresponding simulated detector positions, and determine one or more alignment offsets between the transmitter and the receiver of the LIDAR imaged by the camera in FIGS. 10-11 based on the comparison.

IV. CONCLUSION

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    obtaining a plurality of images using a camera at a given position relative to a light detection and ranging device (LIDAR), wherein the LIDAR includes a transmitter comprising a plurality of light sources, a receiver comprising a plurality of light detectors, and one or more optical elements, and wherein obtaining the plurality of images comprises capturing a first image indicative of a view, via the one or more optical elements, of the receiver;
    determining simulated detector positions for intercepting reflections of simulated light beams associated with the plurality of light sources based on at least a simulation of a physical arrangement of the one or more optical elements and the plurality of light sources and optical characteristics of the one or more optical elements; and
    based on at least the simulated detector positions and the plurality of images, determining one or more alignment offsets between the transmitter and the receiver.

2. The method of claim 1, wherein obtaining the plurality of images comprises:
    capturing the first image while a first aperture is located at a first position between the camera and the LIDAR, wherein the view of the receiver indicated by the first image is also via the first aperture; and
    capturing a second image while a second aperture is located at a second position between the camera and the LIDAR, wherein the second image is indicative of a view of the receiver via the second aperture and the one or more optical elements.

3. The method of claim 2, wherein determining the simulated detector positions comprises:
    determining a first set of simulated detector positions based on a simulation of the first aperture being located at the first position; and
    determining a second set of simulated detector positions based on a simulation of the second aperture being located at the second position.

4. The method of claim 2, wherein the first image is indicative of first measured detector positions of the plurality of light detectors,
    wherein the second image is indicative of second measured detector positions of the plurality of light detectors, and
    wherein determining the one or more alignment offsets comprises comparing the first measured detector positions, the second measured detector positions, and the simulated detector positions.

5. The method of claim 1, wherein determining the simulated detector positions is further based on a scanning range configuration of the LIDAR.

6. The method of claim 1, wherein determining the simulated detector positions comprises:
simulating reflection of the simulated light beams off a simulated object located at a particular distance to the LIDAR, wherein the particular distance is based on a scanning range configuration of the LIDAR.

7. The method of claim 1, wherein obtaining the plurality of images comprises capturing the first image while the plurality of light sources is not emitting light beams, wherein the first image is indicative of measured detector positions of the plurality of light detectors, and wherein determining the one or more alignment offsets is further based on the measured detector positions.

8. The method of claim 1, wherein obtaining the plurality of images comprises capturing a second image while the plurality of light sources is emitting light beams, wherein the second image is indicative of measured positions of the emitted light beams, and wherein determining the one or more alignment offsets is further based on the measured positions of the emitted light beams.

9. The method of claim 8, further comprising:
determining a mapping between the measured positions of the emitted light beams and simulated positions of the simulated light beams; and
based on the mapping, comparing the measured detector positions with the simulated detector positions,
wherein determining the one or more alignment offsets is further based on the comparison.

10. The method of claim 1, further comprising:
causing one or more auxiliary light sources to illuminate the receiver with light having a source wavelength of light emitted by the transmitter.

11. The method of claim 10, wherein obtaining the plurality of images comprises:
capturing the first image while the receiver is being illuminated by the one or more auxiliary light sources; and
capturing a second image while the receiver is not being illuminated by the one or more auxiliary light sources.

12. The method of claim 11, wherein capturing the first image comprises capturing the first image while the transmitter is not emitting light, and
wherein capturing the second image comprises capturing the second image while the transmitter is emitting light.

13. A system comprising:
a platform that supports a light detection and ranging device (LIDAR), wherein the LIDAR includes a transmitter comprising a plurality of light sources, a receiver comprising a plurality of light detectors, and one or more optical elements;
a camera located at a given position relative to the LIDAR; and
a controller that:
causes the camera to obtain a plurality of images including a first image indicative of a view, via the one or more optical elements, of the receiver,
determines simulated detector positions for intercepting reflections of simulated light beams associated with the plurality of light sources based on at least a simulation of a physical arrangement of the one or more optical elements and the plurality of light sources and optical characteristics of the one or more optical elements, and
based on at least the simulated detector positions and the plurality of images, determines one or more alignment offsets between the transmitter and the receiver.

14. The system of claim 13, further comprising:
a shaft coupler that adjusts a mounting position of the receiver in the LIDAR, wherein the controller causes the shaft coupler to adjust the mounting position of the receiver based on at least the determined one or more alignment offsets.

15. The system of claim 13, further comprising:
one or more auxiliary light sources that illuminate the plurality of light detectors using light having a same wavelength as light emitted by the transmitter, wherein causing the camera to obtain the plurality of images comprises:
causing the camera to obtain a first image while the one or more auxiliary light sources are illuminating the receiver, and
causing the camera to obtain a second image while the one or more auxiliary light sources are not illuminating the receiver.

16. The system of claim 15, wherein the one or more auxiliary light sources comprise:
a first auxiliary light source that emits light from a first direction toward the plurality of light detectors; and
a second auxiliary light source that emits light from a second direction toward the plurality of light detectors.

17. The system of claim 15, wherein the one or more optical elements of the LIDAR include a light filter, wherein the first image is indicative of a view of the plurality of light detectors via at least the light filter, and
wherein the one or more auxiliary light sources emit light that illuminates the plurality of light detectors prior to propagating through the light filter.

18. A non-transitory computer readable medium storing instructions that, when executed by one or more processors of a computing device, cause the computing device to perform operations comprising:
capturing a plurality of images using a camera at a given position relative to a light detection and ranging device (LIDAR), wherein the LIDAR includes a transmitter comprising a plurality of light sources, a receiver comprising a plurality of light detectors, and one or more optical elements, and wherein the plurality of images includes a first image indicative of a view, via the one or more optical elements, of the receiver;
determining simulated detector positions for intercepting reflections of simulated light beams associated with the plurality of light sources based on at least a simulation of a physical arrangement of the one or more optical elements and the plurality of light sources and optical characteristics of the one or more optical elements; and
based on at least the simulated detector positions and the plurality of images, determining one or more alignment offsets between the transmitter and the receiver.

* * * * *